US009856047B2

(12) United States Patent
Ford et al.

(10) Patent No.: US 9,856,047 B2
(45) Date of Patent: *Jan. 2, 2018

(54) CARTON DECASING SYSTEM

(71) Applicant: Graphic Packaging International, Inc., Atlanta, GA (US)

(72) Inventors: Colin Ford, Woodstock, GA (US); Thomas A. Rice, Dawsonville, GA (US)

(73) Assignee: Graphic Packaging International, Inc., Atlanta, GA (US)

( * ) Notice: Subject to any disclaimer, the term of this patent is extended or adjusted under 35 U.S.C. 154(b) by 1060 days.

This patent is subject to a terminal disclaimer.

(21) Appl. No.: 13/892,544

(22) Filed: May 13, 2013

(65) Prior Publication Data

US 2013/0247524 A1 Sep. 26, 2013

Related U.S. Application Data

(63) Continuation-in-part of application No. 13/400,953, filed on Feb. 21, 2012, now Pat. No. 9,346,580.
(Continued)

(51) Int. Cl.
*B65B 69/00* (2006.01)
*B65H 15/02* (2006.01)
(Continued)

(52) U.S. Cl.
CPC ............ *B65B 69/00* (2013.01); *B65B 43/126* (2013.01); *B65G 65/00* (2013.01); *B65H 1/00* (2013.01);
(Continued)

(58) Field of Classification Search
CPC ..... B65B 43/26; B65B 43/126; B65B 43/145; B65B 69/00; B65B 69/0075;
(Continued)

(56) References Cited

U.S. PATENT DOCUMENTS 3,777,445 A 12/1973 Anderson
3,866,763 A 2/1975 Alduk
(Continued)

FOREIGN PATENT DOCUMENTS

CN 101653996 2/2010
DE 10 2007 034 947 A1 1/2009
(Continued)

OTHER PUBLICATIONS

Supplementary European Search Report for EP 12 79 0337 dated Jul. 28, 2014.
(Continued)

*Primary Examiner* — Stephen F Gerrity
*Assistant Examiner* — Joshua Kotis
(74) *Attorney, Agent, or Firm* — Womble Bond Dickinson (US) LLP

(57) ABSTRACT

A carton decasing system for removing stacks of cartons or carton blanks from cases or containers includes a case infeed conveyor on which the cases with the cartons or carton blanks stacked therein are moved to an inverting assembly. The inverting assembly reorients the cases and places the cases with the cartons stacked therein on a decasing assembly which removes the cases from the stacks of cartons. The stacks of cartons are thereafter conveyed along a magazine conveyor with the stacks of cartons supported by a stack pusher assembly as the cartons are moved to a discharge point at the distal end of the magazine conveyor.

29 Claims, 18 Drawing Sheets

Related U.S. Application Data

(60) Provisional application No. 61/656,715, filed on Jun. 7, 2012, provisional application No. 61/445,166, filed on Feb. 22, 2011.

(51) Int. Cl.
  *B65G 65/00* (2006.01)
  *B65H 1/00* (2006.01)
  *B65B 43/12* (2006.01)

(52) U.S. Cl.
  CPC ..... *B65H 15/02* (2013.01); *B65H 2301/4221* (2013.01); *B65H 2301/422542* (2013.01)

(58) Field of Classification Search
  CPC ............ B65B 69/0083; B65B 69/0091; B65B 69/005; B65B 69/0058; B65B 35/36; B65H 2301/33214; B65H 2301/422542; B65H 2701/1766; B65H 2301/333; B65H 1/30; B65H 15/02; B65H 2301/4224; B65H 2301/42242; B65H 2301/4223; B65H 2301/332–2301/3332; B65H 2301/4225; B65H 2301/42254; B65H 1/26; B65H 31/30; B65H 31/3036; B65H 31/3045; B65H 31/3072; B65H 31/3081; B65H 31/309; B65H 2301/44712; B65H 2301/44714; B65H 2301/44716; B65H 2301/447; B65H 2301/4471; B65G 65/00; B65G 65/16; B65G 65/23; B65G 65/02; B65G 65/08
  USPC .... 53/381.1, 381.2, 492; 198/403, 404, 408; 414/403–409, 412, 758, 790.2, 790.3, 414/810, 900
  See application file for complete search history.

(56) References Cited

U.S. PATENT DOCUMENTS

| | | | |
|---|---|---|---|
| 3,889,442 A * | 6/1975 | Grahn | B65B 69/0033 414/412 |
| 4,353,675 A | 10/1982 | Risener et al. | |
| 4,548,539 A | 10/1985 | Nagashino | |
| 4,772,169 A * | 9/1988 | Masini | B65B 27/08 271/171 |
| 4,943,206 A * | 7/1990 | Watanabe | B65B 69/00 414/416.08 |
| 5,059,082 A | 10/1991 | Tanttu et al. | |
| 5,067,303 A | 11/1991 | Brookman et al. | |
| 5,209,629 A * | 5/1993 | Rasmussen | B65H 15/02 414/728 |
| 5,271,710 A | 12/1993 | Decharran et al. | |
| 5,330,311 A | 7/1994 | Cawley et al. | |
| 5,615,993 A | 4/1997 | Tanaka | |
| 5,657,617 A * | 8/1997 | Allen | B65B 69/00 53/284 |
| 5,713,713 A * | 2/1998 | Syde | B07C 1/025 414/403 |
| 5,743,374 A | 4/1998 | Monsees | |
| 5,833,076 A * | 11/1998 | Harres | B07C 1/025 209/900 |
| 5,906,468 A * | 5/1999 | Vander Syde | B07C 1/025 414/403 |
| 5,934,866 A * | 8/1999 | Redden | B65H 1/025 198/577 |
| 6,174,122 B1 * | 1/2001 | Krooss | B65B 69/0033 414/404 |
| 6,189,298 B1 | 2/2001 | Kuji et al. | |
| 6,209,704 B1 * | 4/2001 | Pauling | B65G 37/02 198/404 |
| 6,213,707 B1 | 4/2001 | Liehs et al. | |
| 6,290,052 B2 * | 9/2001 | Pauling | 198/404 |
| 6,422,375 B1 * | 7/2002 | Hellman | B65G 61/00 198/404 |
| 6,565,306 B2 | 5/2003 | Fliegel et al. | |
| 6,604,337 B2 * | 8/2003 | Close | B65B 7/28 53/329 |
| 6,694,852 B1 | 2/2004 | Ours et al. | |
| 6,695,570 B2 | 2/2004 | Ford et al. | |
| 6,719,519 B2 | 4/2004 | Liehs | |
| 6,952,911 B2 | 10/2005 | Byrd, Jr. et al. | |
| 7,174,695 B2 * | 2/2007 | Porter | B65B 69/0025 53/381.2 |
| 7,645,113 B2 | 1/2010 | Hendricks et al. | |
| 7,780,396 B2 | 8/2010 | Hendricks et al. | |
| 7,789,226 B2 * | 9/2010 | Carrigan | B65B 5/105 206/215 |
| 8,015,782 B2 | 9/2011 | Borderi et al. | |
| 2002/0033570 A1 | 3/2002 | Crowley | |
| 2002/0146308 A1 * | 10/2002 | Svyatsky | B65H 1/025 414/404 |
| 2003/0103838 A1 | 6/2003 | Liehs | |
| 2003/0120387 A1 | 6/2003 | Sherwin | |
| 2005/0077217 A1 | 4/2005 | Hillerich | |
| 2006/0011648 A1 * | 1/2006 | Yoshitani | B65D 88/56 221/288 |
| 2008/0260506 A1 * | 10/2008 | Enenkel | B07C 1/025 414/419 |
| 2009/0028676 A1 | 1/2009 | Langlot et al. | |
| 2009/0028678 A1 * | 1/2009 | Kutzer | B07C 1/025 414/351 |
| 2013/0247524 A1 | 9/2013 | Ford et al. | |

FOREIGN PATENT DOCUMENTS

| | | |
|---|---|---|
| EP | 0 528 772 A1 | 2/1993 |
| EP | 0 643 924 | 3/1995 |
| EP | 0 933 300 A1 | 8/1999 |
| EP | 1002729 | 10/1999 |
| EP | 1 873 096 A2 | 1/2008 |
| EP | 1975074 | 3/2008 |
| GB | 2132163 | 7/1984 |
| JP | 8301228 | 11/1996 |
| WO | WO02/38449 | 5/2002 |
| WO | WO 2007/100686 A2 | 9/2007 |
| WO | WO2012/161771 | 11/2012 |

OTHER PUBLICATIONS

International Search Report and Written Opinion for PCT/US2012/025882 dated Dec. 14, 2012.

Supplementary European Search Report for EP 13 80 0346 dated Feb. 19, 2016.

International Search Report and Written Opinion for PCT/US2013/040730, dated Sep. 4, 2013.

* cited by examiner

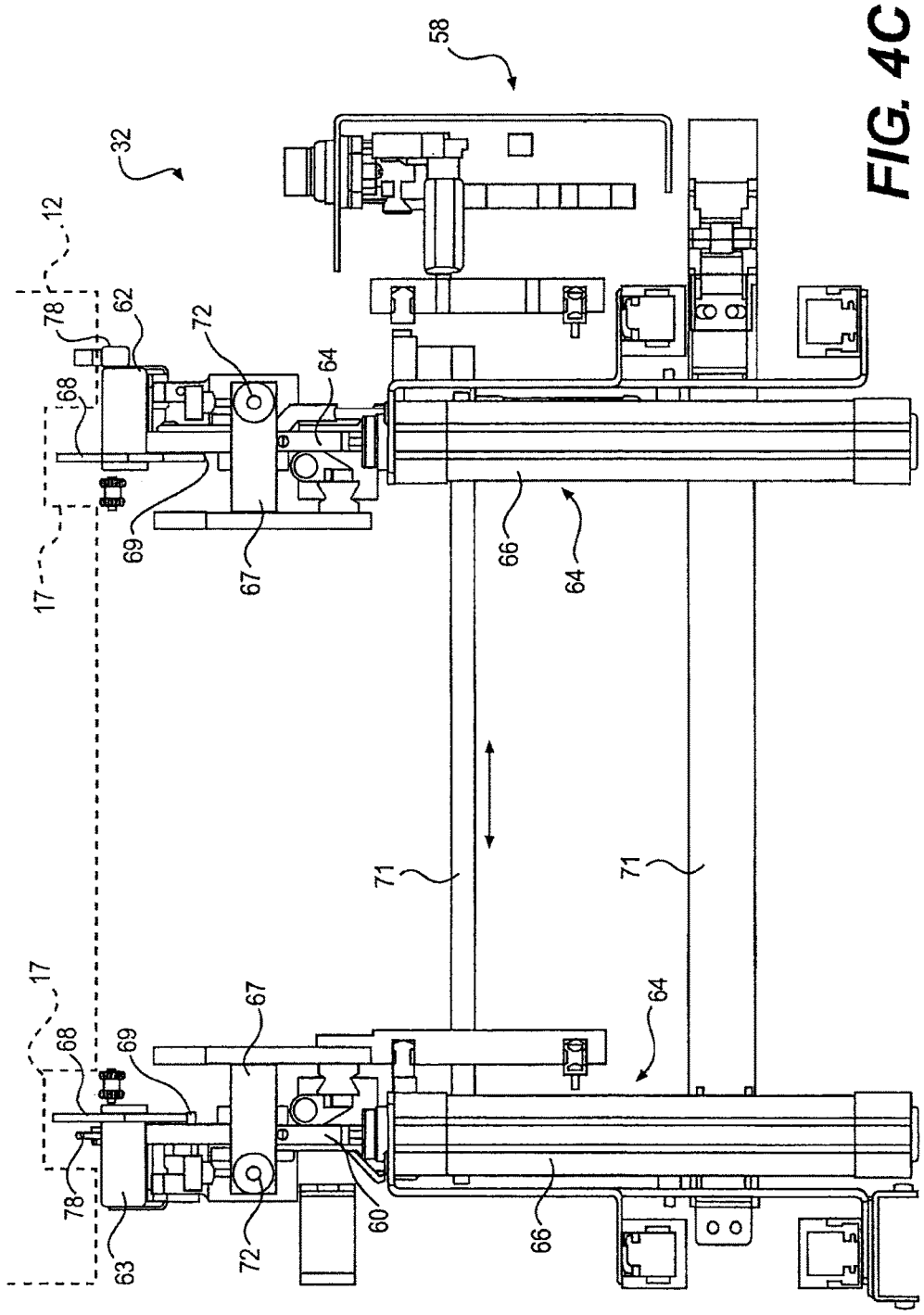

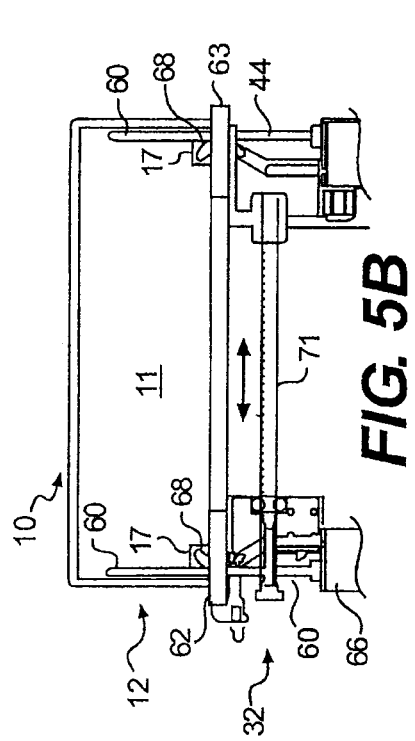
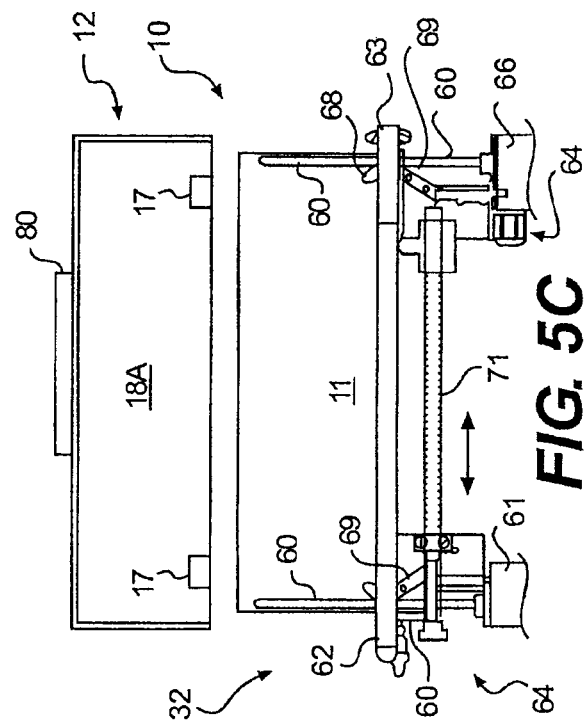
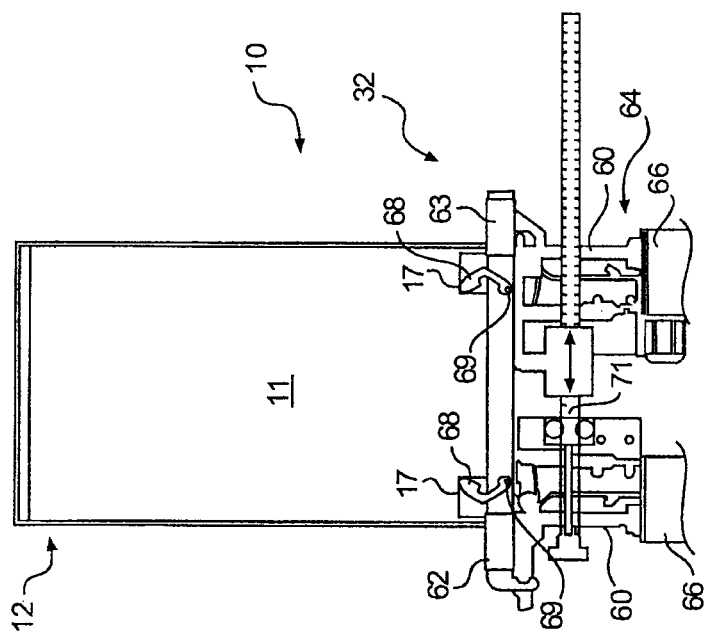
FIG. 5B
FIG. 5C
FIG. 5A

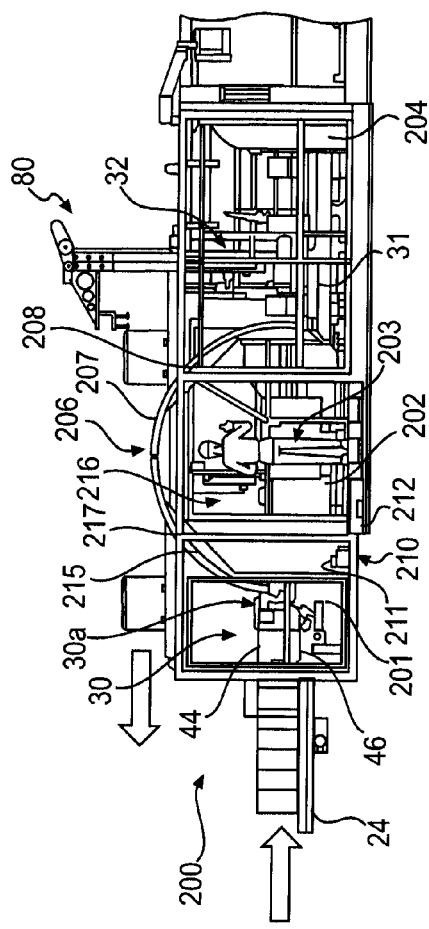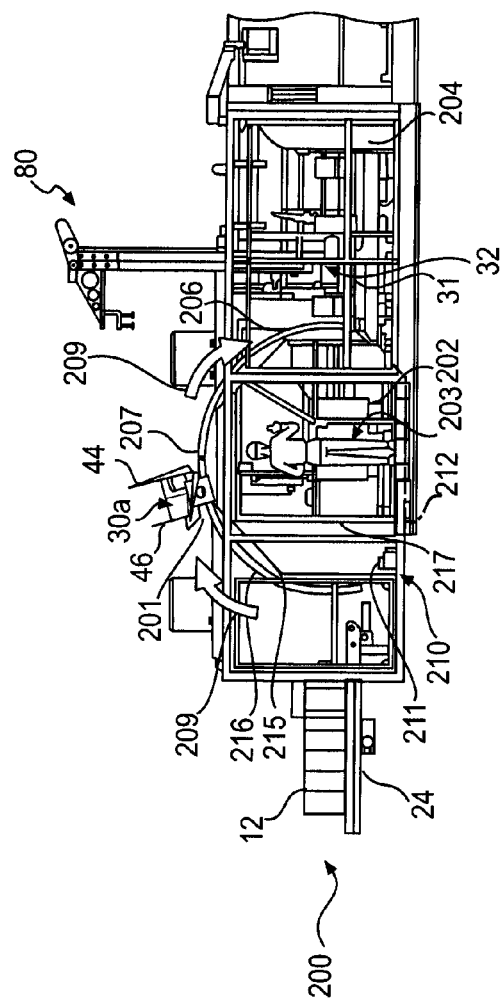

CARTON DECASING SYSTEM

CROSS REFERENCE TO RELATED APPLICATIONS

This application is a formalization of previously filed, U.S. Provisional Patent Application Ser. No. 61/656,715, filed Jun. 7, 2012, and is a Continuation-in-Part Application of co-pending U.S. patent application Ser. No. 13/400,953, filed Feb. 21, 2012, which claims the benefit of Provisional Patent Application No. 61/455,166, filed Feb. 22, 2011, the disclosures of each of said applications being incorporated by reference herein as if fully set forth in their entireties.

FIELD OF THE INVENTION

The present invention generally relates to article packaging and handling systems, and in particular to a system for removing cartons and/or carton blanks from cases or other packaging for the cartons or carton blanks and transporting the removed cartons or carton blanks in stacks to a carton magazine for a packaging machine.

BACKGROUND OF THE INVENTION

In automated product packaging systems, articles such as cans, bottles, individually wrapped food-stuffs, etc., generally are fed into a product packaging machine where such articles can be grouped or otherwise sorted and thereafter placed within or wrapped with a product cartoning material such as a paperboard, cardboard or other, similar material. Such product cartons can be provided as a series of folded and glued carton sleeves that are open at their ends for insertion of the products therein, or can include substantially flat carton blanks that will be folded by the product packaging machine and wrapped about a group of articles or products placed thereon. Typically, the carton sleeves or carton blanks will be loaded into a carton magazine for the product packaging machine in stacks, which carton magazine then will feed individual carton sleeves or carton blanks into the packaging machine for loading with products or for wrapping about a series of product groups.

The cartons, whether formed as carton sleeves or carton blanks, themselves typically are formed by outside vendors who ship the cartons in sleeve or blank form stacked in boxes or cases. Accordingly, before the cartons can be loaded into a carton magazine of a packaging machine, the cartons themselves first must be removed from their cases and thereafter stacked or loaded into the carton magazine. Even though automated carton stacking and loading systems have been developed for automatically loading stacks of cartons within the carton magazines of packaging machine or similar automated packaging equipment, it is still necessary to first remove the stacks of cartons from their containers or cases and thereafter load the stacks of cartons on the magazines or on automatic magazine loaders for feeding to the magazine for a packaging machine.

Generally, even though some automated removal systems have been developed, the removal of cartons from their boxes or cases typically has been a manual operation requiring an operator to manually remove the cases from about the cartons, and thereafter stack or restack the cartons, including in some cases inverting the cartons, and load them on a magazine loader or directly into the carton magazine of a packaging machine. Such manual operations can, however, cause repetitive strain injuries due to the repetitive handling of heavy carton loads by workers. In addition, when the cartons are removed from their cases, either manually or by current automated systems, it is often difficult to maintain the cartons in an ordered stack and prevent at least some of the cartons within the cases from being lifted with the case when the case is removed due to friction between the carton edges and case walls. As a result, workers often have to restack or remove portions of the stack of cartons from a case after the case has been removed, which takes additional time and can further contribute to repetitive strain injuries, or cause inefficiencies in operation.

Accordingly, it can be seen that a need exists for a system and method for removal of stacked cartons from their cases or containers that addresses the foregoing and other related and unrelated problems in the art.

SUMMARY OF THE INVENTION

Briefly described, the present invention generally relates to a system and method for automatically removing cartons or carton blanks from cases or other, similar containers in a stacked configuration such as for feeding into a magazine of a downstream product packaging machine. According to one example embodiment of the carton decasing system according to the principles of the present invention, cases containing stacks of cartons, such as, for example carton blanks or sleeves for packaging bottles, cans or other products in 2×6, 2×8, 2×12, 4×6 or other varying product configurations, will be loaded onto a carton infeed. The cases can be queued up along the carton infeed for presentation to an inverting assembly at the downstream end of the case infeed, and typically, will be loaded with the upper ends of the cases being open, and with notches or recesses also generally being formed in the upstream and downstream side walls of the cases.

The cases initially are fed into the inverting assembly which includes an inverter head that is pivotally mounted on a support frame. The inverter head further generally includes a pair of adjustable side guides and a pair of top and bottom support guides that are vertically adjustable with respect to one another so as to define a receiving area therebetween for receiving a case of a predetermined or preselected size therein. As the inverter head is rotated or pivoted about its support frame, the cases with the cartons stacked therein are correspondingly reoriented and are deposited on a downstream magazine or stacking conveyor, with the closed bottom end of each case generally being realigned in upwardly facing attitude or direction. The inverter head and magazine conveyor further are adjustable vertically to enable adjustment of the position of the cases with respect to an overhead case lifting mechanism, so as to accommodate different height or size cases as needed.

The cases are initially deposited on a carton decasing assembly for removal of the case from the stack of cartons contained therein. The carton decasing assembly generally includes an adjustable framework having laterally adjustable side guide rails on which the cases are received and initially supported, and a series of containment rod mechanisms mounted on supports or holders that are moveable longitudinally with respect to the side guide rails so as to enable adjustment of the longitudinal position of the containment rod mechanisms. The adjustment of the side guide rails laterally, together with the longitudinal adjustment of the locations of the containment rod mechanisms enables the carton decasing assembly to be adjusted to accommodate varying length/depth and width cases.

Once deposited or located on the carton decasing assembly, a series of gripping lugs, which are also mounted on the longitudinally sliding supports or holders that carry the containment rod mechanisms, are pivoted into engagement with the cartons, typically moving or passing through the recesses or gaps formed in the cases so as to engage and compress the stack of cartons inwardly. The compression of the stack of cartons within the cases by the gripping lugs creates spacings/openings between the cartons and case walls in which the extensible containment rods can be received. The containment rods are inserted into and pass between the foremost and rearmost cartons of the stack of cartons and the front and rear side walls of their case so as to hold the cartons in a stacked configuration as the case is removed therefrom and prevent the walls of the case from frictionally engaging or otherwise dislodging cartons from the stack. As a result, each case is removed from its stack of cartons with the cartons being maintained in a stacked, substantially aligned configuration. Thereafter, the cartons are conveyed further along the magazine conveyor as the emptied cases are removed for disposal.

As a stack of cartons is conveyed by the carton decasing assembly toward a discharge point or end of the magazine conveyor, and/or approaches a rearmost carton of a previously decased stack of cartons on the magazine conveyor, a stack pusher assembly will correspondingly engage the stack of cartons for urging the stack of cartons forwardly with the continued forward motion of the magazine conveyor. Thereafter, at about the same time, the containment rods can be disengaged from the stack of cartons and the carton decasing assembly retracted back to its initial, loading or case receiving position adjacent the inverting assembly. The stack pusher assembly generally will include at least one stack pusher that, in one embodiment, can comprise a pair of extensible pusher rods each moved between extended and retracted positions by an actuator, such as a pneumatic or hydraulic cylinder, or other similar actuator. The pusher rods further can be carried by an overhead support linked to a drive system connected to the drive mechanism for the magazine conveyor so as to move with the forward movement of the magazine conveyor.

The drive system of the stack pusher assembly also can be disconnected from the magazine conveyor so as to be independently driven for moving the stack pusher assembly to a retracted position as needed for engaging a next stack of cartons loaded on the magazine conveyor. Thus, as the next loaded stack of cartons approaches a prior loaded stack of cartons, the pusher rods will be retracted as the decasing assembly conveys the next stack of cartons into a combined, stacked arrangement against the prior loaded stack of cartons. The drive mechanism for the stack pusher assembly also can be disengaged from the magazine conveyor, and operated to retract the stack pusher assembly to a position behind the rearmost carton of the next stack of cartons being loaded, after which the pusher rods can be extended into an engaging position against the combined stack of cartons as the containment rods of the carton decasing assembly are retracted and the carton decasing assembly is moved back to its initial, loading position. The drive mechanism of the stack pusher assembly further can be reengaged with the magazine conveyor to continue its forward motion with its pusher rods engaging and supporting the combined stack of cartons as the cartons are fed to the discharge point of the magazine conveyor.

Various features, objects and advantages of the present invention will become apparent to those skilled in the art upon a review of the following detailed description, when taken in conjunction with the accompanying drawings.

BRIEF DESCRIPTION OF THE DRAWINGS

FIG. 4C is an end view of the extensive containment rods of the carton decasing assembly.

FIGS. 5A-5C are perspective illustrations showing the engagement of the grippers and containment rods of the carton decasing assembly for engagement and holding of a stack of cartons as the case is removed therefrom.

FIGS. 9A-9C are side elevational views schematically illustrating the extended orbital movement of the inverter head of the decasing system of FIG. 8.

Those skilled in the art will appreciate and understand that, according to common practice, the various features of the drawings discussed below are not necessarily drawn to scale, and that dimensions of various features and elements of the drawings may be expanded or reduced to more clearly illustrate the embodiments of the present invention described herein.

DISCUSSION OF THE INVENTION

Figure 1:
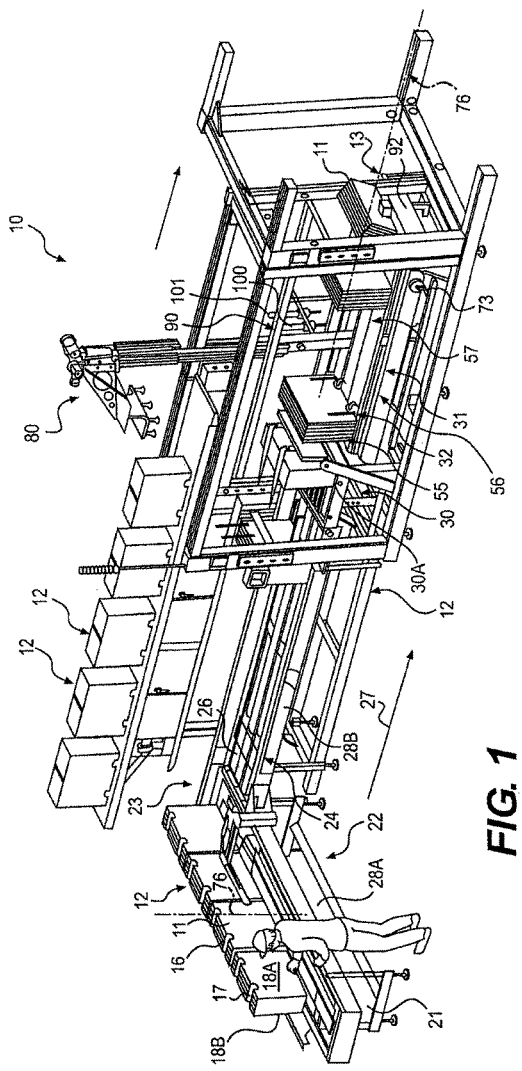
FIG. 1 is a perspective illustration of the automatic carton decasing system according to the principles of the present invention.

Referring now to the drawings in which like numerals indicate like parts throughout the several views, FIGS. 1-7D illustrate the automatic carton decasing system 10 and the operative assemblies thereof for removal of stacks of cartons 11 from cases or other containers 12 and for automatically loading such decased or removed carton stacks into a carton magazine 13 for feeding into a feeder assembly of a downstream packaging machine, as indicated in FIG. 1. The cartons 12 can be received as stacks of flat carton blanks or as preformed carton sleeves, or in other configurations as needed or desired, and as will be understood by those skilled in the art, and will be oriented and removed from their cases in a stacked, substantially aligned configuration. The automatic carton decasing system further is designed to fit with and/or be operable with a variety of different type or size packaging machines, for example for use with a Quikflex 600, Quikflex 2100, and/or G3 packaging machines such as manufactured by Graphic Packaging International. The automatic carton decasing system further can be designed for retrofitting to existing packaging machines in the field, and further is adapted to unload/remove and load a full range of carton sizes and/or configurations as well as different case proportions and materials. For example, the automatic carton decasing system of the present invention can be utilized with 2×2, 3×4, 4×6 or other carton sizes and can handle cartons of a variety of sizes and shapes, including long, short cases, substantially square cases and tall and wide cases, such as illustrated at 12A and 12B, respectively, in FIGS. 3B-3C and 5A 5C.

FIG. 1 generally illustrates one example embodiment of the automatic carton decasing system 10 according to the principles of the present invention, which generally includes an elongated frame 21, which frame generally can be adapted to match its parent packaging machine. At an upstream end or section 22 of the frame 21 comprises a case infeed 23. The case infeed 23 generally will comprise a conventional conveying system 24 such as a chain conveyor, belt conveyor or other known type of conveying mechanism including belts, slats, chains or other conveying elements 26 that are driven about a substantially continuous path in the direction of arrow 27 by a motor or similar drive mechanism (not shown). An operator can load the cases with cartons stacked therein on the upstream or first end of the case infeed conveyor 24, with the cases being queued in a line or supply arrangement.

Figure 2:
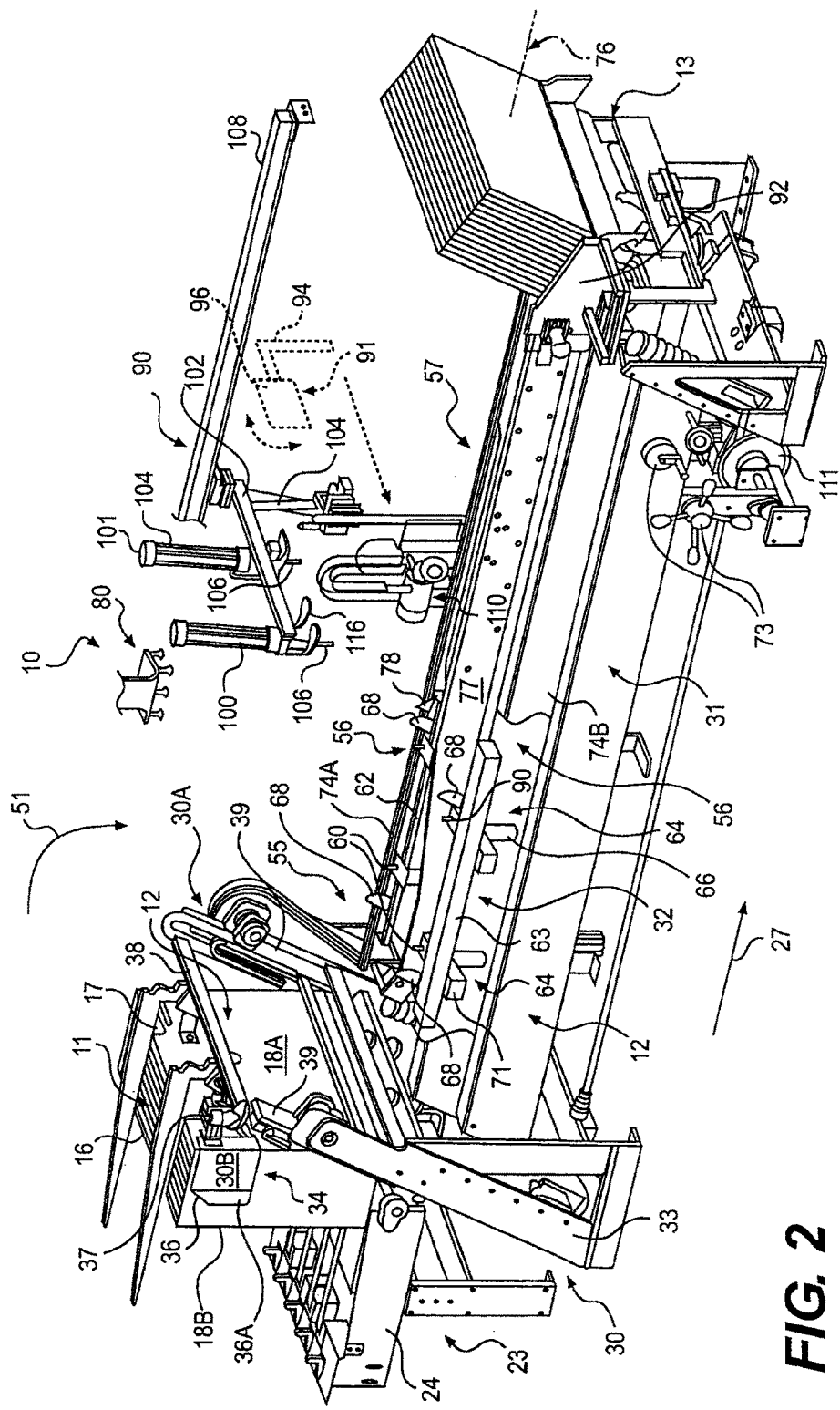
FIG. 2 is a perspective view of the inverting assembly and stacking conveyor for receiving and inverting the packaged cartons for removal of the case therefrom.

As indicated in FIG. 1, the cases 12 will be oriented on the case infeed conveyor 24 in an upstanding attitude and with a top or upper end 16 of the cases 12 being open and a series of recesses, cut-outs, gaps or similar features 17 formed in the leading and trailing side walls 18A/18B of the cases. The case infeed conveyor 24 will convey the cases in series to an inverting assembly 30, which inverts or otherwise reorients the cases so that the cases can be quickly and easily removed from the cartons while the cartons are maintained in a stacked configuration as illustrated in FIGS. 2-3B. Alternatively, the cases can be conveyed or transported to the inverting assembly from a remote location or an automatic depalletizer. As indicated in FIG. 1, the case infeed conveyor further can be designed with respect to the inverting assembly 30 so that different length case infeed conveyors and/or extensions of the case infeed conveyor can be provided in either in-line or perpendicular arrangements to suit available space in a desired or required line layout. For example, as shown in FIG. 1, the cases 12 can be loaded onto a first, upstream section 28A of the case infeed conveyor, and can then be transferred to and/or reoriented on a second, downstream section 28B, which conveys the cases to the inverting assembly 30 at the downstream end thereof.

As illustrated in FIGS. 1 and 2, the cases 12 with the cartons 11 stacked therein are conveyed to the downstream end of the case infeed conveyor and are brought into engagement/registration with the inverting assembly 30 positioned at the downstream end of the case infeed conveyor. The inverting assembly inverts or reorients the cases with the cartons contained therein and places them on a stacking or magazine conveyor 31 having a carton decasing assembly 32 initially located in a first or case receiving position adjacent an upstream end of the magazine conveyor, as indicated in FIGS. 1 and 5A-5C. The inverting assembly thereafter will release each case, which will be moved with the decasing assembly along the magazine conveyor away from the inverting assembly and to a second or intermediate position for removal of the case as indicated in FIG. 1.

Figure 3A:
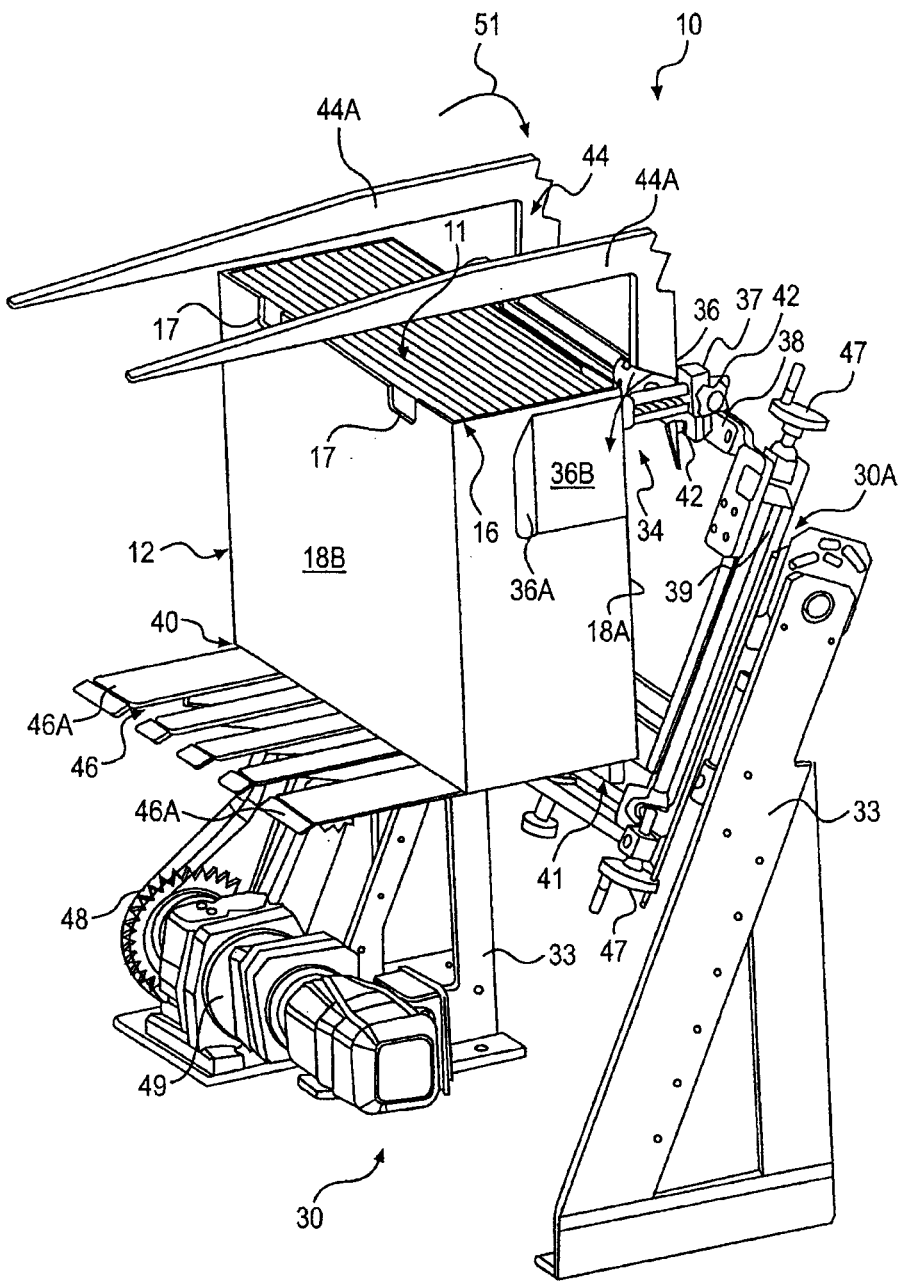
FIG. 3A is a perspective view of the inverting assembly with a case of stacked cartons received therein.
Figures 3B, 3C:
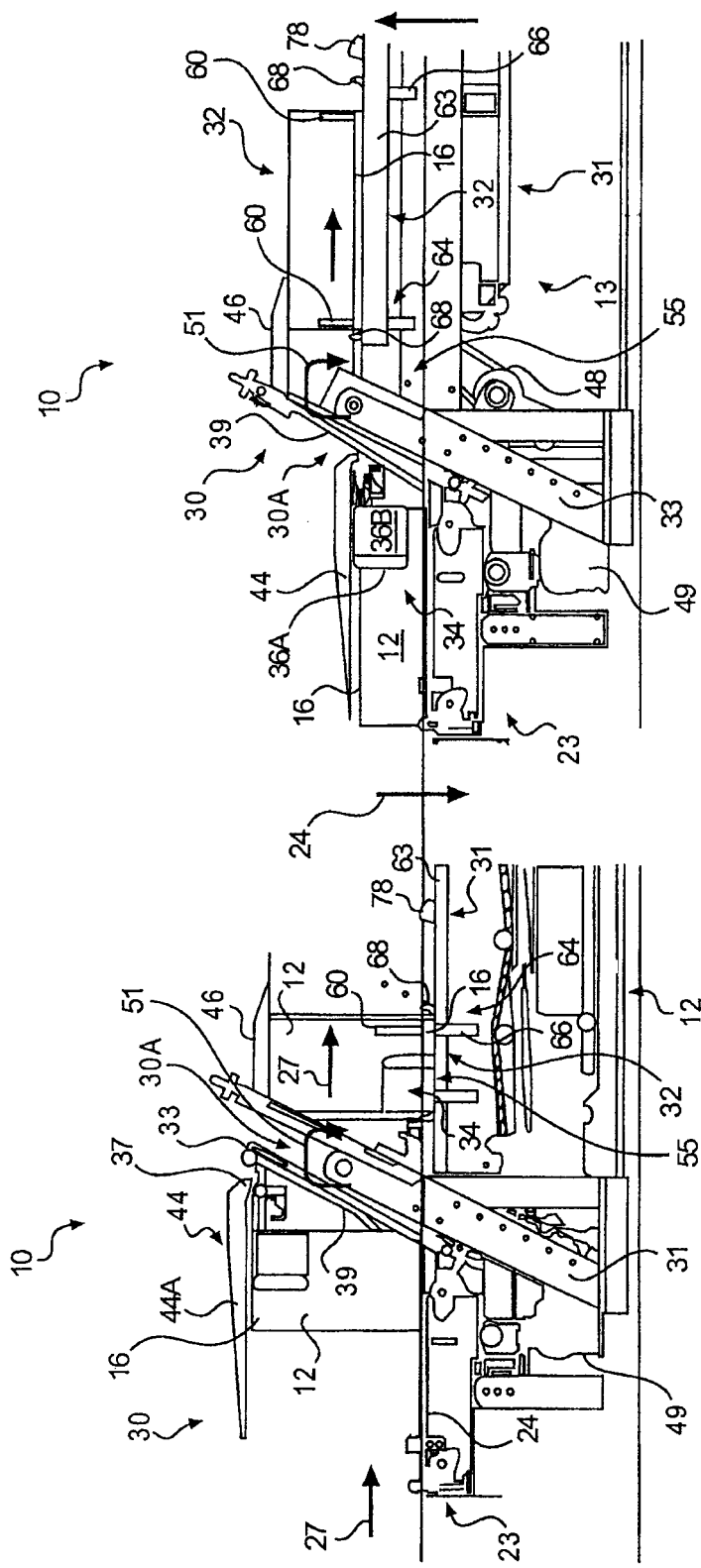
FIGS. 3B and 3C are side elevational views illustrating the inverting of the carton cases at different heights for different size or geometry cartons.

As illustrated in FIGS. 2 and 3A, the inverting assembly 30 generally includes an inverter head 30A pivotally mounted on a pair of upstanding frame members or supports 33, and includes a pair of side guides or clamps 34 that are adjustable laterally so as to be repositionable as needed to engage different size cases. Each of the side guides 34 generally will include a rearwardly projecting plate or arm 36 typically having an outwardly flared first or guide portion 36A and a substantially flat body or second portion 36B mounted to an adjustable slide support 37. The slide supports 37 are movably mounted on a support rail 38 that extends laterally between a pair of vertical slides or supports 39, that further are mounted to a carrier or base frame member 41, which pivotally attaches and supports the inverter head 30A on frame members 33. As FIG. 3A indicates, the slide supports 37 can be moved laterally toward and away from each other, and can be fixed in place such as by set screws 42, or other, similar fasteners, to define a width for a receiving area 40 of the inverter head 30A in which the cases 12 are received, with the outwardly flared guide portions 36A of the side guides 34 helping to center and guide the cases into the receiving area. For example, as indicated in FIGS. 3A-3C, for taller, thinner cases, the side guides can be adjusted inwardly to accommodate the reduced width or thinner configuration of the cases.

The inverter head 30A further includes top and bottom case support guides 44 and 46 that engage the top and bottom ends of the cases, for positively gripping and holding the cases during inversion or reorientation thereof to prevent the cartons from becoming dislodged or otherwise inadvertently released from the cases during inversion or reorientation thereof by the inverting assembly. As shown in FIGS. 2 and 3A, the case support guides 44 and 46 generally are mounted to vertical slides or supports 39, with the positions of the case support guides being adjustable therealong, such as by cranks or handwheels 47 to define a height for the receiving area 40 of the inverter head. As generally indicated in FIG. 3A, the case supports further can include spaced forks, tines or plates 44A/46A, or can include other types of supports. The inverter head further can be connected to or engaged by a drive belt 48 or similar conveying mechanism driven by a motor such as indicated at 49 in FIG. 3A for controlling the rotary motion of the inverter head for lifting, inverting and depositing the cases onto the magazine conveyor 31 (FIG. 2).

Accordingly, as the case support guides 44 and 46 engage and lift and pivot the cases with the cartons stacked therein, as indicated by arrows 51 in FIGS. 3B and 3C, so as to reorient the cases in an inverted or upside down configuration, with the open top portions 16 of the cases being placed in a substantially downwardly facing alignment on the magazine conveyor 31. In their initial stack receiving position, the case support guides 44, 46 generally are separated by a gap that is greater than the case height. As the inverter head 30A inverts, the lower case support guide 46 can move toward the upper case support guide 44, which closes this gap and thus conforms the case support guides to the case height. As a result, when the case is inverted, the lower case support guide, which was below the case on the infeed side, is now engaging on top of the case to prevent the case from tipping, and holding it square and upright to facilitate insertion of case containment rods 60 (FIGS. 4A-4C) during a decasing operation (FIGS. 5A-5C).

As further illustrated in FIGS. 3B and 3C, the magazine conveyor 31 can be set at varying heights as needed depending upon the type of parent packaging machine and/or the type/configuration of cartons and cases being fed for decasing without affecting the operation of the inverting assembly 30. The geometry of the inverting assembly, and the adjustability and/or closing engagement of its side guides and case support guides with a case 12 during inversion and placement of the case on the magazine conveyor, allows a fixed height case infeed conveyor 24 to be utilized with variable height magazine conveyors, with the case inverting assembly automatically adjusting for case size and placing the case on the correct magazine height for the packaging machine. For example, as shown in FIG. 3B, a tall case can be inverted and placed on the magazine conveyor, with the magazine conveyor adjusted and set at a lowered height, while for shorter or reduced height cases, as shown in FIG. 3C, the magazine conveyor 31 can be set at a higher level as needed for feeding the cartons into the magazine, without requiring reconfiguration or change-out of the inverting assembly 30. Instead, a simple adjustment of the positions of the side guides and case support guides so as to readjust the receiving area in which the cases are received and engaged, can be made to ensure a secure lifting and reorientation of the cases.

As further indicated in FIGS. 1-2, the carton decasing assembly 32 generally is initially located at the upstream or first end of the magazine conveyor 31 in a first, case receiving or loading position, indicated at 55, for receiving and engaging the cases after they are inverted by the inverting assembly. FIGS. 4A-5C generally illustrate the carton decasing assembly 32, which is movable along the magazine conveyor 31 between its first loading position, a second, intermediate or case removal position, indicated at 56 in FIG. 7A, and a third, downstream or disengaging position indicated at 57 in FIG. 6. The movement of the decasing assembly 32 is controlled by a drive mechanism 58 (FIG. 4D) that is independently operable from the magazine conveyor.

The carton decasing assembly 32 (FIGS. 4A-4B) generally includes an adjustable framework or sled 61 including laterally adjustable side guide rails 62 and 63 on which the cases are initially received, and a series of containment rod mechanisms 64. Each containment rod mechanism includes a vertically extensible case containment rod 60, which is extensible between a lowered, resting or non-engaging position (FIG. 4A) and a raised, engaging position (FIG. 4B) by operation of an actuator 66, such as a pneumatic or hydraulic cylinder or other, similar actuator. Each of the containment rod mechanisms further is carried on adjustable supports or holders 67 to enable variation of the longitudinal positions of the containment rod mechanisms as needed to accommodate varying depth or length cases. A series of gripping lugs 68 also are pivotally mounted to the supports 66 for the containment rod mechanisms, and are extensible/pivotable by actuators, as indicated at 69, so as to move through the recesses or gaps 17 (FIGS. 5A-5C) formed in the leading and trailing side walls of the cases 12 and into engagement with the cartons within the cases for gripping and applying pressure to the stacked cartons, as illustrated in FIGS. 5A 5C.

Figure 4A:
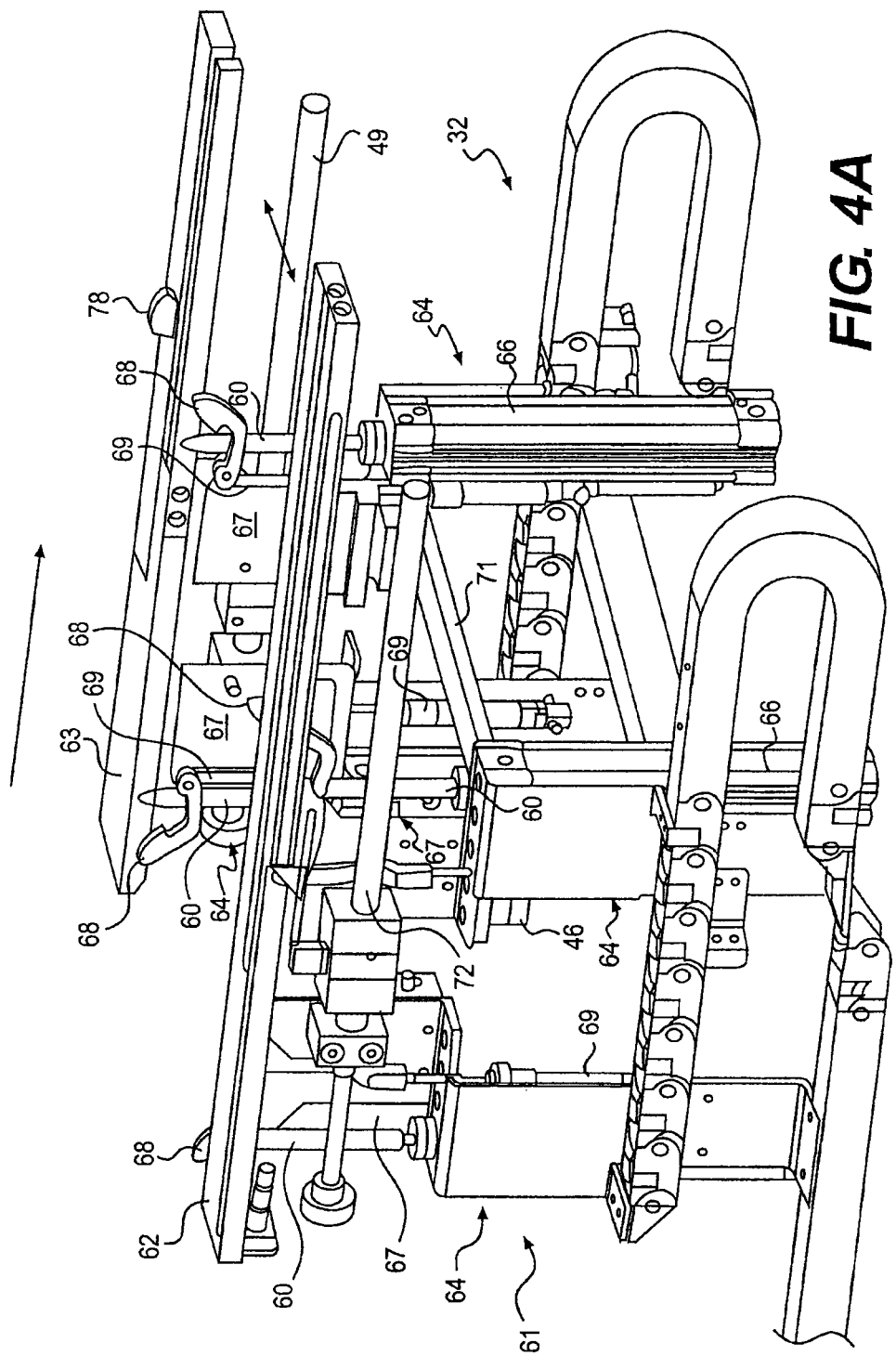
FIGS. 4A and 4B are perspective illustrations of the carton decasing assembly with the containment rods thereof shown in retracted and raised positions.
Figure 4B:
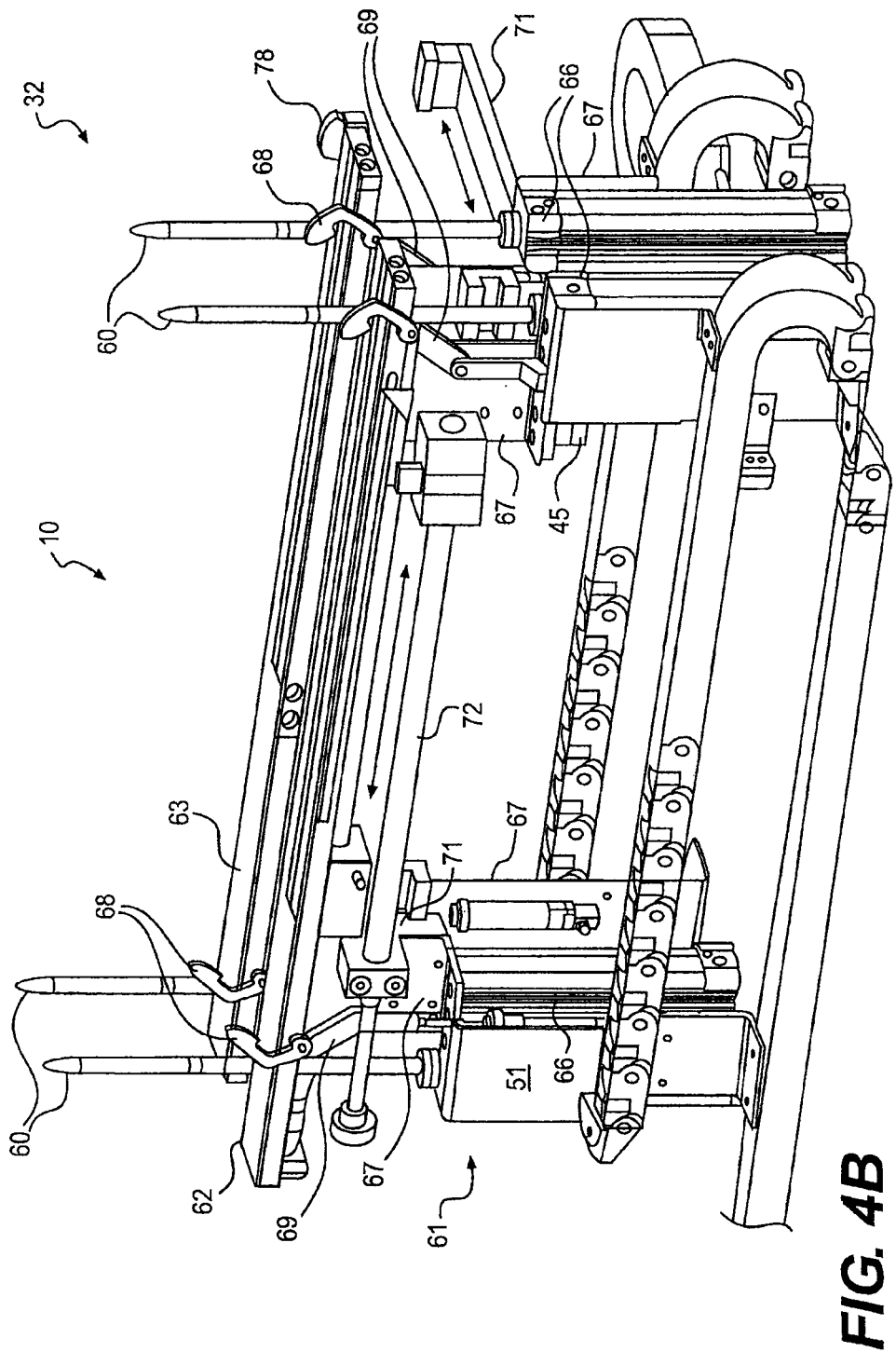
Figure 4D:
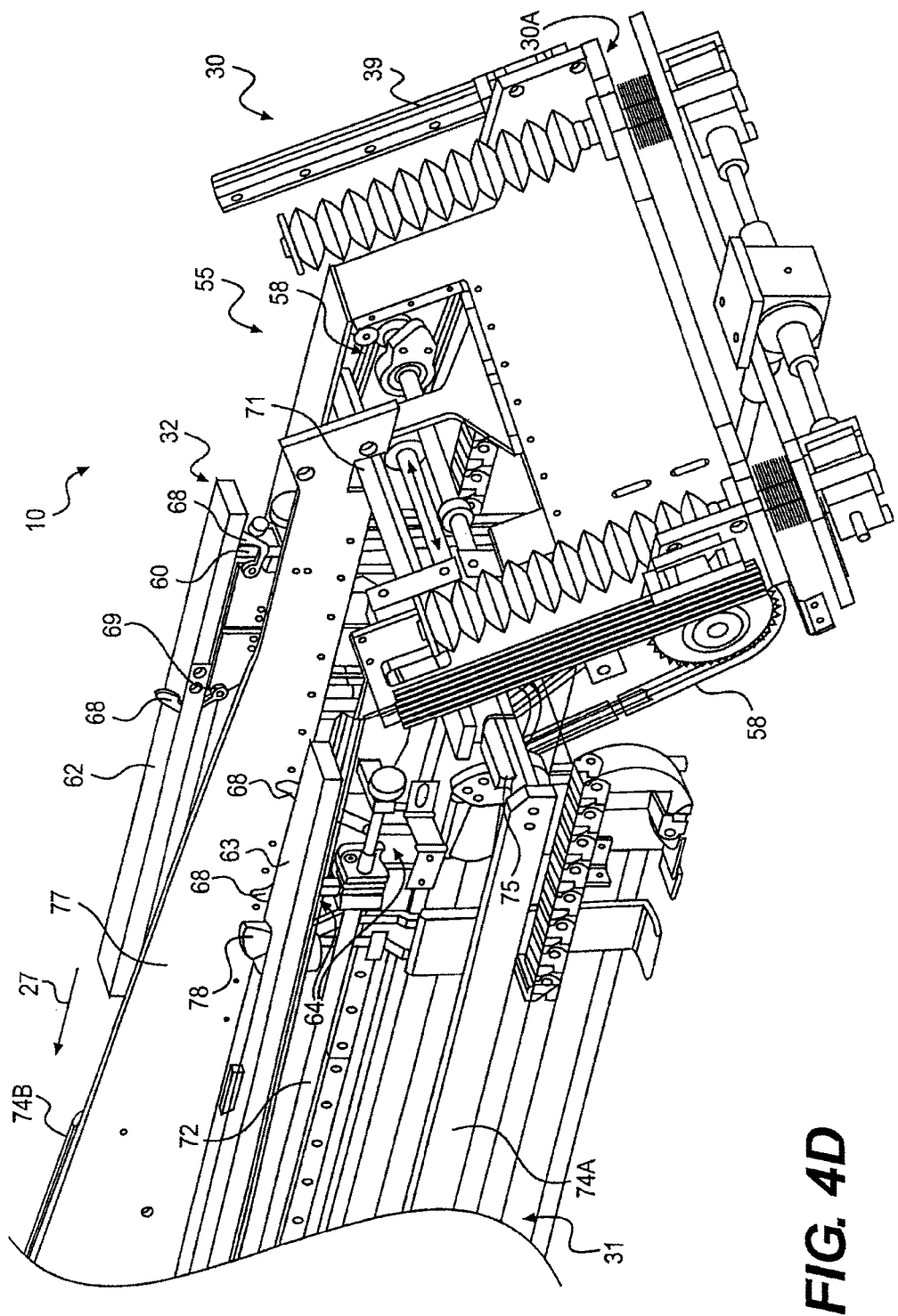
FIG. 4D is a perspective view of the fore or proximal end of the stacking conveyor and the carton decasing assembly.

As further illustrated in FIGS. 4A, 4B and 4C, each of the adjustable guide rails 62/63 is adjustable laterally along rails 71 to accommodate different size or configuration of cases, and the positions of the containment rods 60 further are adjustable longitudinally, such as by sliding movement of their supports 66 along guide rails 72 to further enable adjustment of the framework 61 of the carton decasing assembly to accommodate different size and/or configuration cases 12, as illustrated in FIGS. 5A-5C. As indicated in FIG. 2, an adjustment mechanism 73, here shown as a hand-wheel or crank, although it will be understood that other manual and automatic adjustment mechanisms also can be used, will be provided along the magazine conveyor 31 for adjustment of the width of the magazine conveyor, and with it the width of the carton decasing assembly, to accommodate different width/size cartons. Preferably, a first side 74A of the magazine conveyor and the side guide rail (i.e., 63) associated therewith can remain fixed or stationary, with the opposite or second side 74B of the magazine conveyor being movable along laterally extending guide rails, such as shown at 75 in FIG. 4D, to adjust its position with respect to the first side 74A of the magazine conveyor, and with it, the position of side guide rail 62 with respect to side guide rail 63 of the carton decasing assembly.

The adjustments of the magazine conveyor, and with it, the carton decasing system, to accommodate varying size and/or configuration cartons and their cases generally will be made with respect to the parent packaging machine into which the cartons are to be fed. The parent machine generally will act on a fixed score line date based on a crease or fold line about which the cartons are folded to provide a reference axis or line (indicated at phantom line 76 in FIG. 1) for the X-Y-Z adjustments of the magazine conveyor and carton decasing assembly. The adjustments of the side frame assemblies of the carton decasing assembly both laterally and longitudinally accordingly are part of the size change procedure for the automatic carton decasing system, with such longitudinal and lateral adjustments generally being controlled via manual drive mechanisms and sensors so as to match the spacing of the containment rods and gripper lugs to the particular size and/or configuration of the cases and accordingly the stacks of cartons contained therein. Typically, the positions of the containment rods will be adjusted to match the longitudinal size or thickness of the stacks of cartons, and to locate the containment rods approximately adjacent the fold or crease lines of the cartons to ensure stable and even engagement therewith as the cartons are conveyed along the magazine conveyor with the containment rods.

FIGS. 5A-5C generally illustrate the operation of the decasing assembly 32. Initially, after the case has been inverted and placed on top of the magazine conveyor and moved into registration or otherwise located for engagement by the carton decasing assembly 32, the gripper lugs 68 and containment rods 60 are generally in their retracted, non-engaging positions. Typically, the cases will have been formed with cutouts 17 (FIG. 2) that enable access therethrough by the gripper lugs 68 for engaging and holding the cartons (FIGS. 5A-5C). Initially, the gripper lugs will be engaged to first centralize the carton load and at least partially compress the stacks of cartons inwardly. This engagement/compression of the stacks of cartons further will create spaced gaps or openings along the sides of the cartons to facilitate and/or enable entry of the containment rods 60, between the cartons and the leading and trailing side walls of the cases, as indicated in FIG. 5B. Additionally, as the cartons and cases are moved along the magazine conveyor, they will engage and ride along a sloped center guide 77 that assists in supporting the cartons and cases and in keeping them in a substantially square attitude or alignment as the containment rods are inserted.

Figure 7A:
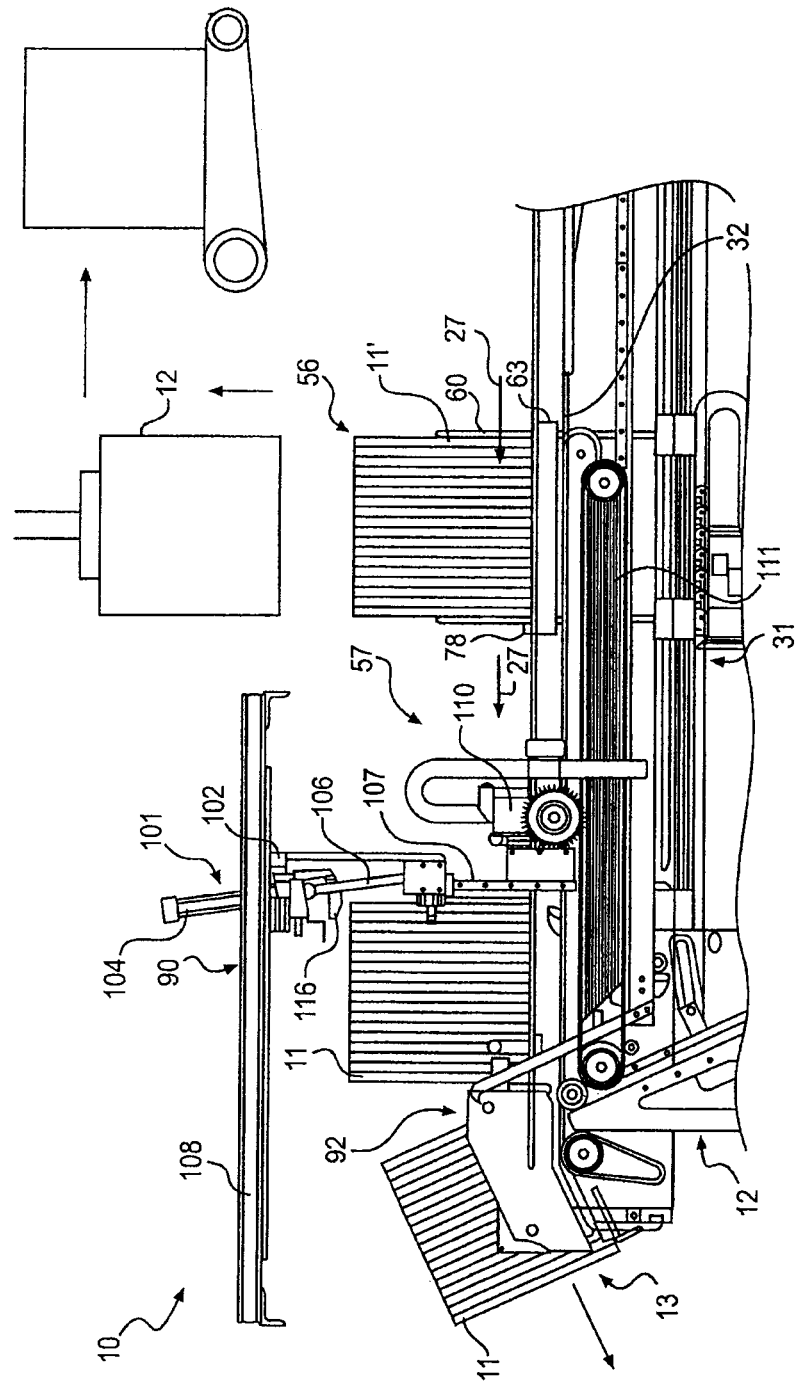
FIGS. 7A-7D are schematic illustrations of the operation of the stack pusher assembly for moving the stacks of cartons to a discharge point after removal of the cases therefrom.
Figure 7B:
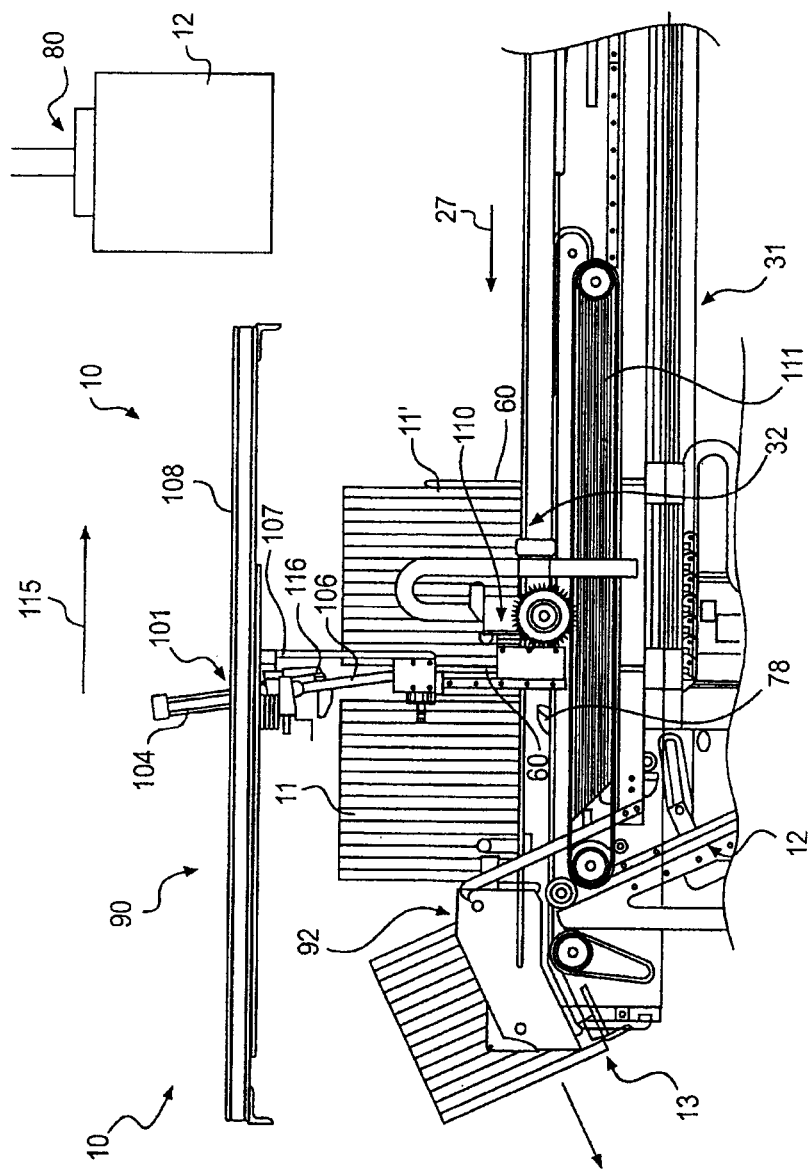
Figure 7C:
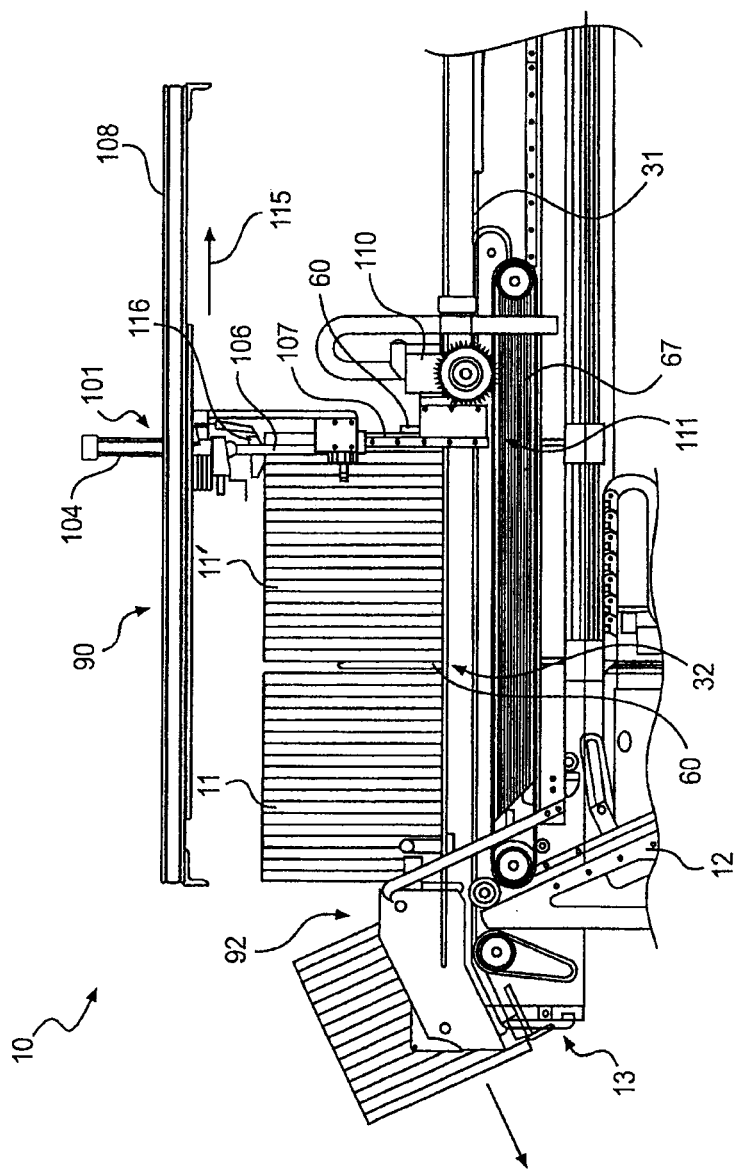

Thereafter, as illustrated in FIG. 5C, with the cartons being held by the containment rods, the case will be lifted off of its stack of cartons by a lifting mechanism 80 (FIG. 1) as the rods remain in a raised, engaging position for holding the stacks of cartons in place and as the case is removed therefrom. The containment rods will remain up for decasing and subsequent transfer of the carton load to the back of a carton magazine such as being combined with a prior loaded stack thereon, thus supporting the carton load until a stack pusher assembly 90 engages the stack of cartons and locates the stack of cartons against the back of previously loaded supply or stack of cartons within the magazine, as indicated in FIGS. 7A-7C. A sensor 78 (FIG. 4D) generally can be provided at an upstream end of the adjustable frame/sled 61, which can be engaged by the prior loaded stack of cartons, as the sled approaches the stack. The activation of this sensor 78 signals the activation of the pusher assembly and retraction of the carton decasing assembly. At the same time, the gripper lugs generally will release the cartons from engagement as the case is lifted off of the stack of cartons as shown by FIG. 5C, which gripper lugs will further be retracted below the cartons as indicated in FIG. 5A.

As illustrated in FIGS. 1, 2, 6 and 7A-7D, the stack pusher assembly 90 generally is located along the magazine conveyor 31, downstream from the carton decasing assembly 32. The stack pusher assembly 90 can include one or more stack pushers 91 movable along the length of the magazine conveyor, which stack pushers will engage the stacks of cartons after they are removed from their cases and will hold a final or rearmost carton at the back of a stack of cartons being fed into the discharge point 92 of the magazine conveyor. In one embodiment, the at least one stack pusher 91 can comprise a pivoting arm, indicated at phantom lines 94 in FIG. 2, having a pusher plate 96, and which is adapted to be pivotable into and out of the path of travel of the stacks of cartons, which is movable with the operation of the magazine conveyor to maintain the stacks of cartons at an upright, stacked attitude.

Alternatively, as illustrated in FIGS. 2, 6 and 7A-7D, in another embodiment, these stack pushers can include a pair of extensible pusher rod assemblies 100/101 mounted above the magazine conveyor and movable along a parallel path of travel therewith. The pusher rod assemblies 100/101 generally will be spaced apart along a laterally extending support rail, with the lateral position or location of the pusher rod assemblies along the support rail 102 being adjustable with respect to one another to accommodate different size cartons. For example, the lateral positions of the pusher rod assemblies can be adjusted with respect to a centerline of the parent packaging machine to align their pusher rods 106 with creases or fold lines of the cartons. Typically, the pusher rod assemblies each will include an actuator 104, such as a hydraulic or pneumatic cylinder, and a pusher rod 106 which is extensible to a lowered, engaging position and can be retracted upwardly to a non-engaging or retracted position out of engagement with the cartons.

Figure 6:
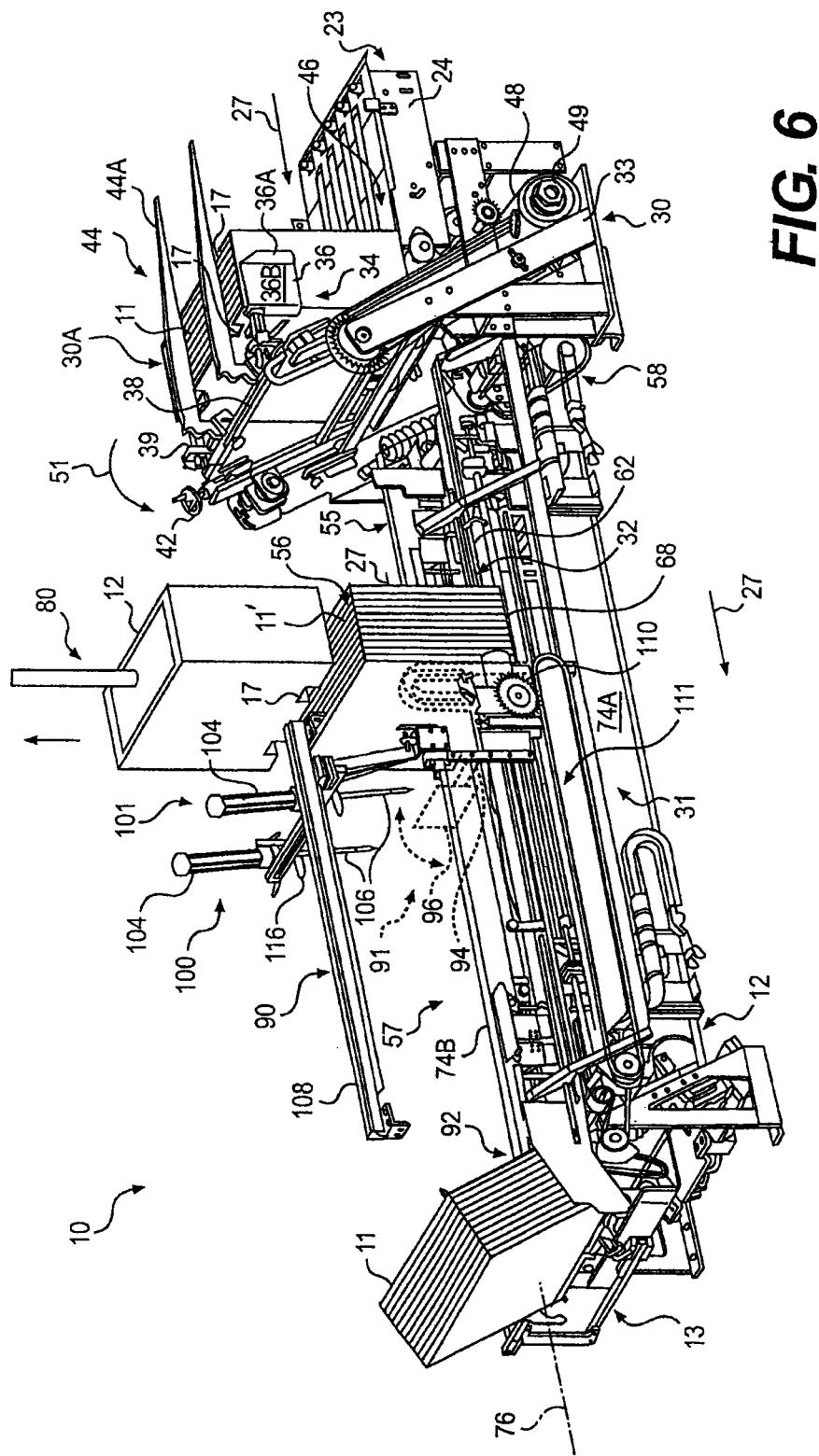
FIG. 6 is a perspective view of the stacking conveyor, illustrating the stack pusher assembly and carton decasing assembly according to the principles of the present invention.

The pusher rods 106 can be provided with a length sufficient to engage a variety of different height cartons, or alternatively, the position of the support rail 102 can be adjusted vertically along guide arm 107 to further adjust the vertical position of the pusher assemblies 100/101. Thus, the height of the pusher assemblies can be further adjusted as needed to accommodate variations in size of the cases. As also indicated in FIGS. 2 and 6, the support rail 102 is slidable along an upper guide rail 108, which helps control and maintain consistent movement of the pusher assemblies in a substantially parallel path of travel to the path of travel P of the cartons along the magazine conveyor. The vertical support 107 also connects the support rail 102 and thus the pusher assemblies 100/101 mounted therealong to an independent drive system 110.

Figure 7D:
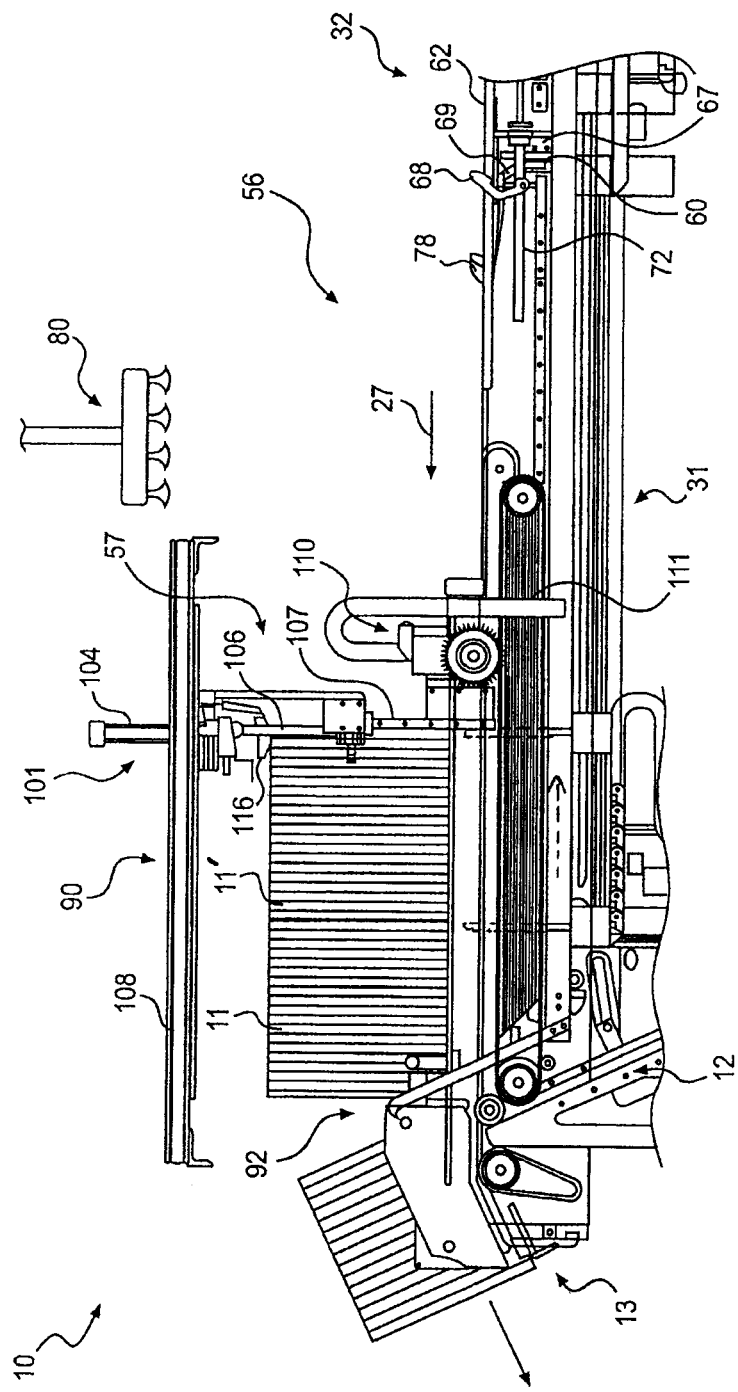

As indicated in FIGS. 6-7D, the independent drive system 110 of the stack pusher assembly is disengagably connected to the magazine conveyor drive mechanism or system 111 so as to generally be moved therewith as the cartons are fed along the magazine conveyor with the pusher rods of the stack pushers in engagement therewith. However, the drive system 110 for the stack pusher assembly further is separably operable as needed to permit the stack pusher assembly to be moved longitudinally, upstream and downstream, independently of the movement of the magazine conveyor as needed to retract and/or reposition the stack pusher assembly as indicated in FIGS. 7A-7D. Thereafter, the stack pusher assembly can be re-synced with the movement of the magazine conveyor to maintain the stack pusher assembly in engagement with the stacks of cartons being fed along the magazine conveyor into the downstream magazine 13. Thus, when the stack pusher is operated with the magazine conveyor, its motor is at rest and the stack pusher sprocket is engaged with the chain with the stack pusher(s) engaging the carton stack as the whole assembly moves in concert. However, when the stack pushers need to move upstream to go behind a new stack of cartons, its stack pusher motor drives the stack pusher assembly upstream, along its chain and along the magazine conveyor, whether the magazine is stationary or indexing to feed a next carton.

The operation of the stack pusher assembly is generally illustrated in FIGS. 7A-7D. After the cases have been removed from the cartons, the cartons are conveyed in a stacked configuration by the carton decasing assembly 32 along their path of travel P along the magazine conveyor 31 toward the discharge end or point of the magazine conveyor. As indicated in FIG. 7A, after the initial startup and loading of a first stack of cartons on the magazine conveyor, the next stack of cartons being conveyed or moved along the magazine conveyor by the carton decasing assembly will approach a previously loaded stack of cartons 11, which stack of cartons is maintained in a substantially upright, or slightly forward leaning attitude by the engagement of the stack pusher assembly therewith.

As the next stack of cartons 11' approaches the previously loaded stack of cartons 11, the sensor 78 (FIG. 4D) at the upstream end of the sled 61 of the carton decasing assembly 32 will be engaged, such as by contacting a rearmost carton (FIG. 7B) of the previously loaded stack of cartons. Upon engagement and activation of the sensor 78 (FIG. 4D), as indicated in FIGS. 7B and 7C, the activation of the sensor by the approach of the next stack of cartons being carried by the carton decasing assembly towards the rearmost carton of the preceding loaded stack of cartons will cause the disengagement of the stack pusher assembly. Upon a disengagement signal being sent to the stack pusher assembly, the pusher rods 106 will be retracted, as indicated in FIG. 7B, and the drive system 110 for the stack pusher assembly will be disengaged from the magazine conveyor. Thereafter, as indicated in FIG. 7C, the stack pusher assembly drive mechanism will be independently operated so as to move the stack pushers rearwardly, in the direction of arrow 115, to a retracted position behind the rearmost carton of the stack of cartons on the carton decasing assembly.

Once the stack pushers have been retracted to their rearward position, as indicated in FIG. 7D, the pusher rods will be extended into engagement with the rearmost carton of the combined stack of cartons and the drive system for the stack pusher assembly will be reengaged with the drive system or drive mechanism of the magazine conveyor. Additionally, as indicated in FIGS. 6 and 7B-7C, as the stack pushers are moved to their retracted position, a pair of shoes 116 can engage and pass over the top edges of the cartons to ensure that the cartons will not be caught or otherwise engaged by the pusher rods. These shoes also can be linked to a sensor to signal a fault condition if movement of the shoes along the cartons is disrupted or interfered with during retraction of the stack pushers. After the pusher rods of the stack pushers have been engaged with the rearmost carton of the combined stack of cartons, the containment rods of the carton decasing assembly can be retracted, releasing the cartons from engagement therewith, after which the carton decasing assembly can be moved back to its initial, loading or carton receiving position adjacent the upstream end of the magazine conveyor and the inverting assembly. Thereafter, as indicated in FIG. 7D, the stack pushers will continue to move forwardly with the forward motion of the magazine conveyor as the cartons are sequentially fed through the discharge point of the magazine conveyor and into a downstream packaging machine magazine.

Figure 8:
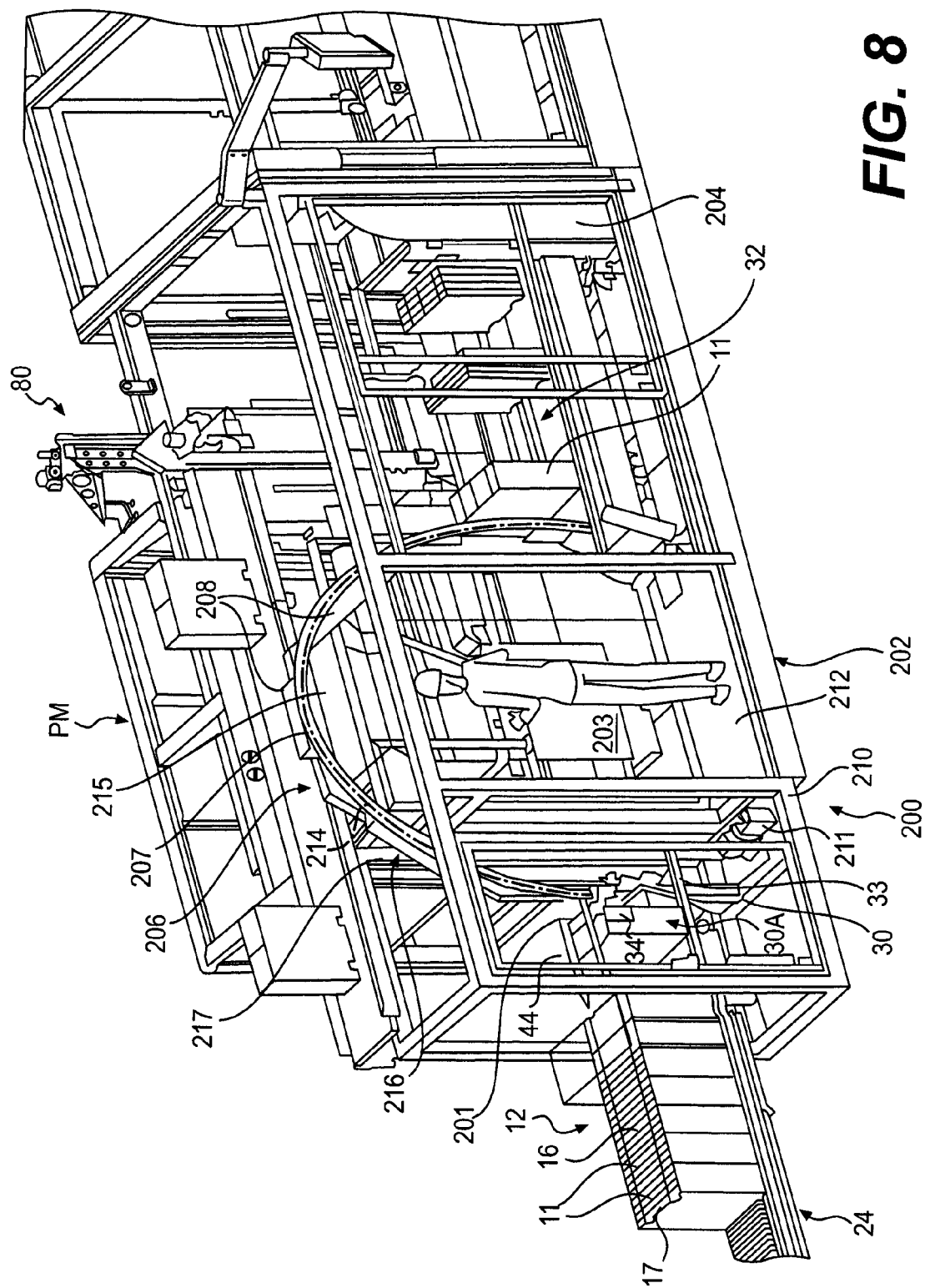
FIG. 8 is a perspective illustration of an alternative embodiment of the carton decasing system according to the principles of the present invention.
Figure 9C:
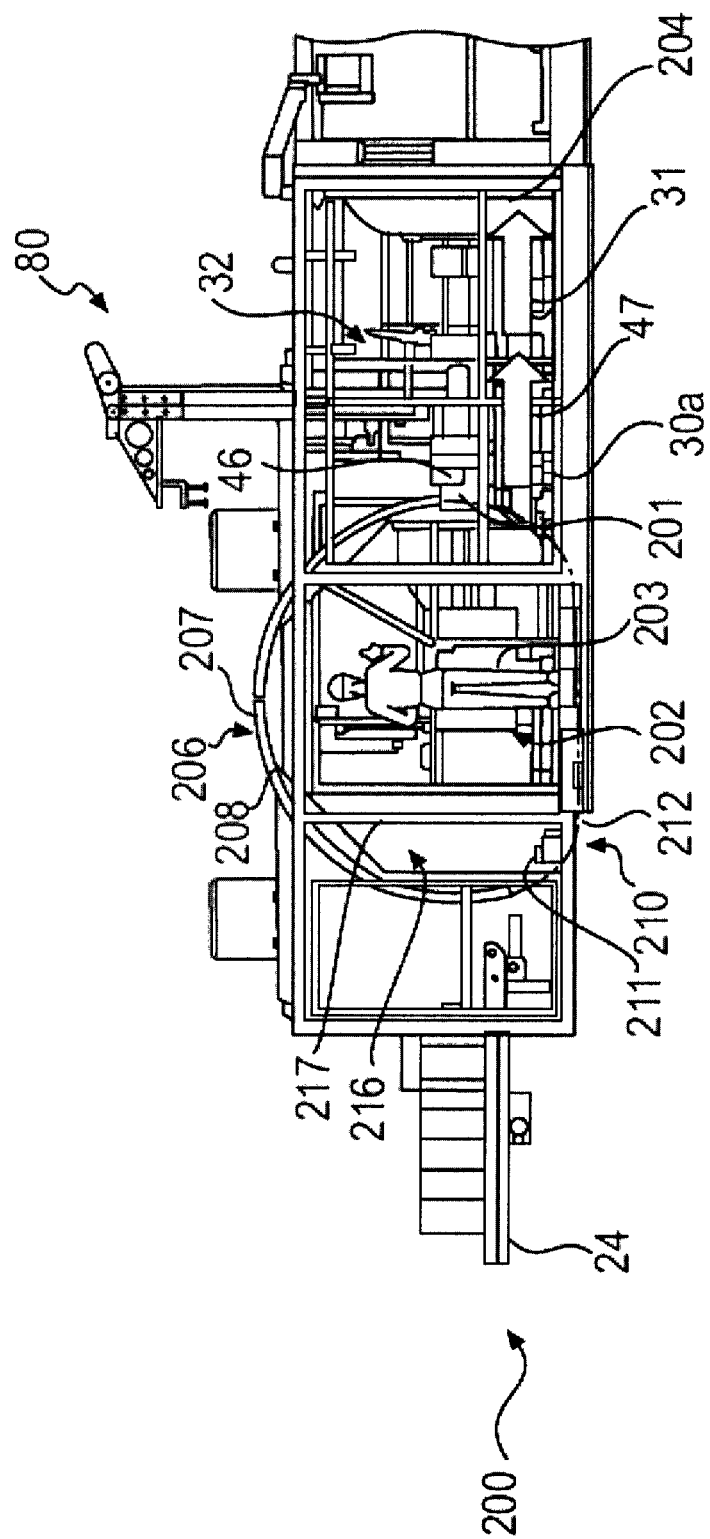
Figure 10:
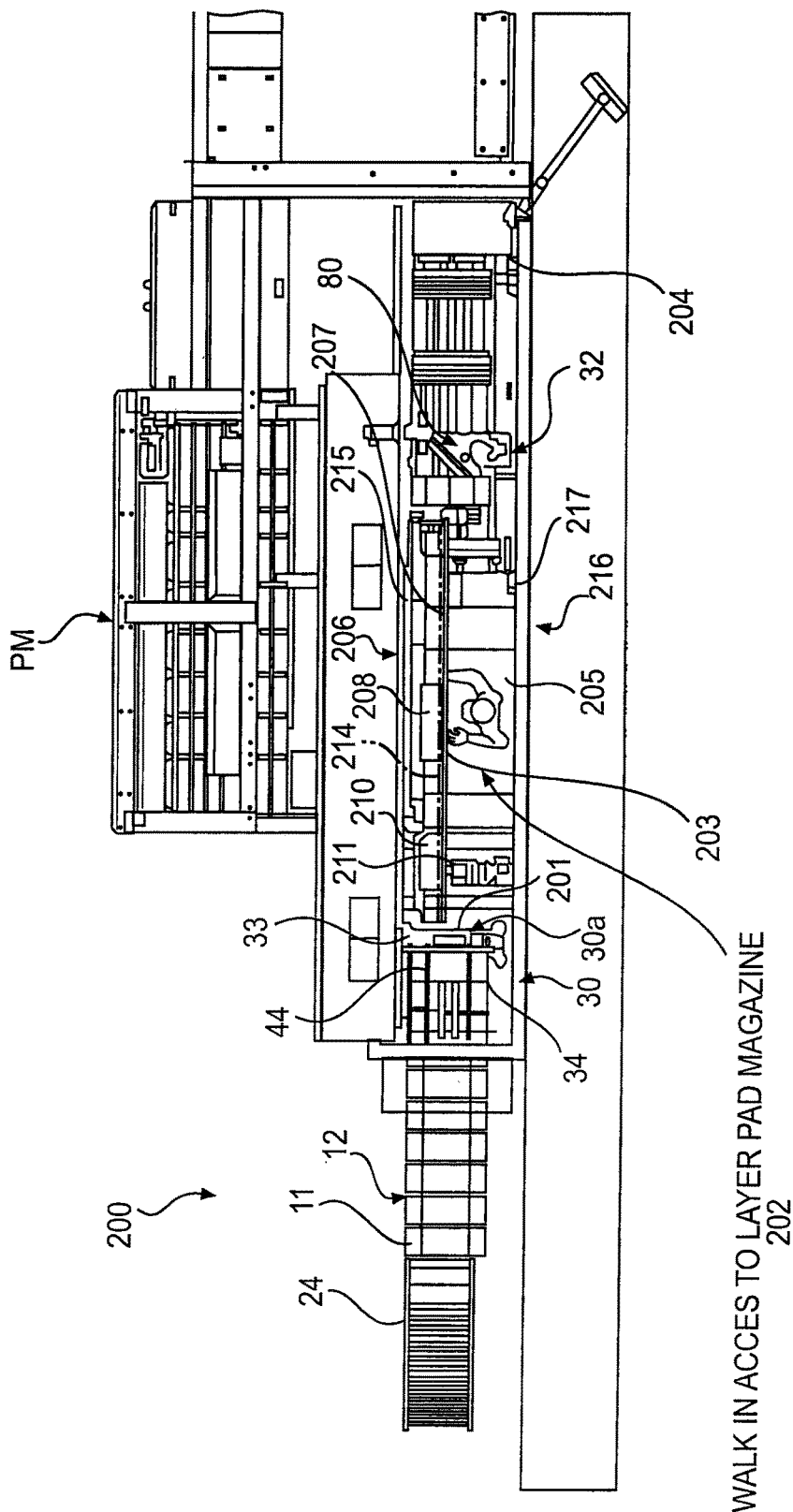
FIG. 10 is a plan view of the decasing system of FIG. 8.

An additional embodiment of the carton decasing system 200 according to the principles of the present invention is generally illustrated in FIGS. 8-10. The embodiment of the decasing system 200 shown in FIGS. 8-10 is designed to enable access to the packaging machine PM, as needed, such as for loading additional materials, clearing jams, etc. For example, the decasing system can be adapted for use with "twin stack" type packaging systems and equipment wherein a first stack or layer of products, such as bottles or cans or other similar product, are placed upon a carton, after which a layer pad is placed over the first or lower stack of products placed on the carton, after which a second layer or stack of products is placed on top of the layer pad and the carton folded thereabout to form a "twin stack" product package. The layer pads typically are inserted between the stacks of products at an intermediate point along the path of travel of the products through the twin stack packaging machine and thus access must be provided to the layer pad magazine for loading of additional layer pads therein. The decasing system 200 according to the present embodiment is adapted to provide the automated decasing features of the present invention for use with such a twin stack or other style packaging machines while also enabling access to the layer pad magazine and/or other areas of the packaging machine by an operator, without requiring reconfiguration of the packaging machine and/or without substantial disruption in the decasing of the cartons for feeding into the carton magazine of the packaging machine.

As illustrated in FIGS. 8-10, the cases 12 with the cartons 11 stacked therein will be fed along the case infeed conveyor 24 to the inverting assembly 30 where the cases are engaged by the inverter head 30A thereof. The case infeed conveyor and inverter head 30A generally will have substantially the same construction as discussed above with reference to FIGS. 1-3C. Thus, as with the embodiment of the carton decasing system illustrated in FIGS. 1-3C, the inverter head will generally be mounted on adjustable frame members or supports 33 and generally will include side guides or clamps 34 that are adjustable laterally to receive cases of different sizes and/or configurations, as well as top and bottom case support guides 44 and 46 (FIGS. 9A-9B) that likewise are vertically adjustable along the frame members of the inverter head to accommodate different size and/or configuration cases.

In the present embodiment of the carton decasing system 200, the inverter head further will be mounted on a carriage 201, which conveys the inverter head 30A about an extended, orbital path over and above a layer pad magazine access area or station 202 provided along the path of movement of the cases. This layer pad magazine access area 202 enables the operator to access the twin stack packaging machine PM (FIGS. 8 and 10) for loading of a stack or series layer pads into the layer pad magazine 203 of the twin stack packaging machine. Such access further is provided without disruption of the operation of the carton decasing system for removing stacks of cartons form their cases and feeding such stacks of cartons into a carton magazine 204 of the packaging machine.

As illustrated in FIGS. 8-9C, the carriage 201, on which the inverter head 30A of the carton decasing system 200 is supported, is mounted on a radially extending track or rail assembly 206. As shown in the figures, this rail assembly 206 extends along an orbital path, upwardly and over the layer pad magazine access area 202, from the downstream end of the case infeed conveyor to the upstream magazine conveyor 31. The rail assembly 206 generally will include one or more rails 207, which could include V-rails, box rails, or other configuration rails, and which can further include a series of rollers mounted therealong for supporting the carriage as it is moved along the rails. The rails 207 are supported over the layer pad magazine access area by an orbital frame 208.

The carriage 201 of the inverter head 30A generally will engage and ride along the rails of the rail assembly 206 and will be moved about its orbital path, indicated by arrows 209 in FIG. 9B, for transporting a case with the stacked cartons therein over the operator and layer pad magazine access area 202 for depositing the case in an inverted position onto the magazine conveyor 31. A drive system 210 will control the orbital movement of the carriage 201 along the rail assembly 206. The drive system 210 generally will include a reversible, variable speed motor, such as shown at 211, and a drive mechanism or means, illustrated by phantom lines 212 in FIG. 8, that transports the carriage 201 along its orbital path as shown in FIGS. 9A-9C. The drive motor 211 generally will be a variable speed, reversible motor sized for a duty cycle and load to accommodate varying size and weight cases containing varying size cartons stacked therein. The motors also can include a reducer so as to increase the torque of the motor to accommodate varying size/weight loads of cartons and can be operated at cycle rates of approximately 30-45 seconds per operational cycle, although greater or lesser cycle rates also can be used. The drive mechanism 212 further can include one or more chains, cables, belts, or a combination of chains, belts and/or cables (shown in phantom lines 214 in FIG. 8) that are received within and moves along the rails 207 of the rail assembly 206 in a reversible, back and forth motion under operation of the drive motor 211. Also, the drive mechanism could include an orbital rack and pinion, with a pinion gear being driven by a motor mounted to the inverter head.

As illustrated in FIGS. 9A-9C, once a case 12 with a stack of cartons therein has been engaged and contained within the inverter head 30A of the inverting assembly 30 by the side guides and bottom case support guides (the top support guide generally floating over and conforming to the top of the case as the case is inverted), the drive motor 211 generally will be actuated to commence inverting of the case and cartons. As indicated in FIG. 9B, the motor will pull the drive chain or other drive mechanism along the rails of the rail assembly 206, causing the carriage 201 to transport the inverter head 30A about its orbital path as shown by arrows 209, upwardly and over the layer pad magazine access area

202. The inverter head thus will be moved about its expanded, orbital path for inversion of the case, and will place the inverted case on the magazine conveyor 31 as discussed with respect to the prior embodiment of FIGS. 1-6. Thereafter, a carton decasing operation can be commenced, as discussed above with respect to the prior embodiment and as illustrated in FIGS. 6-7D, for removal of the cases from the stacks of cartons, after which the cases can be removed from the carton decasing system and packaging machine along their overhead conveyor, while the stacks of cartons are fed into the carton magazine 204 for the packaging machine PM. As the cartons are fed to the carton magazine, the drive motor 211 of the drive system 210 also can be reversed, pulling the drive chain(s) 214 of the drive mechanism 212 (FIG. 8) rearwardly so as to transport the inverter head in a reverse direction along its orbital path, back to its initial, home position at the downstream end of the case infeed conveyor for receiving a next case with a stack of cartons therein.

The embodiment of the carton decasing system 200 illustrated in FIGS. 8-10 thus enables the use of the carton decasing system according to the principles of the present invention with additional types of packaging machines, such as twin-stack type packaging machines, by providing an operator with walk-in access to the layer pad magazine of the packaging machine for loading of additional layer pads and/or for providing access to the packaging machine as needed for clearing of jams, etc. As further illustrated in FIGS. 8-10, the access area 202 defined within the carton decasing system 200 generally will include a series of protective panels or barriers, generally indicated at 215 forming a protective housing or cage 216 beneath the rail assembly 206 along which the carriage 201 is conveyed during a case inverting operation. Such barriers 215 can include Plexiglas or safety glass panels supported by frame members 217, which panels or barriers 215 can further be removable or otherwise pivotally mounted to the frame member so as to enable access to the rail assembly 206 as needed for maintenance or repair/replacement or other adjustments thereof. Additionally, other panels or barriers also can be used, including the formation of a wire cage or similar protective housing, so that the operator can be provided with substantially safe/protected access to the layer pad magazine or other areas of the packaging machine during operation of the inverting assembly 30 of the carton decasing system 200.

The automatic carton decasing system of the present invention thus is designed to maximize the use of space by utilizing the smallest footprint possible, while maintaining front guard line and maintenance side clearance as needed for the infeed conveyors. Additionally, as noted, the case infeed conveyor is provided with an in-line layout enabling extensions of the case infeed conveyor as needed. The automatic carton decasing system further is provided with open access for each of the operative assemblies for ease of changeover and maintenance, and is generally adapted to be a self-contained unit to enable magazine loading and unloading with or without decasing functionality so that the system can be utilized in various configurations and as a retrofit or upgrade to existing packaging systems. The system further can be primed by loading a limited number of cartons initially within the feeder to create an initial stack against which later decased carton stacks will be placed, while the empty cases are dischargeable along a high level conveyor to help reduce the system footprint, and which further can be reconfigured to provide case discharge anywhere in an approximately 180° radius for discharging cases into a bin or baler or directing them to some other type of containment unit for collection and disposal or recycling.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed:

1. A system for removing cartons from containers for loading into a product packaging machine, comprising:
   a case infeed along which the containers are fed in series to a magazine conveyor;
   a first assembly for inverting and placing the containers with the cartons stacked therein in an inverted position on the magazine conveyor;
   a second assembly downstream of the first assembly and movable along the magazine conveyor between a loading position adjacent the case infeed and a case removal position, the second assembly including a frame with a plurality of supports movable in lateral and/or longitudinal directions into positions sufficient to configure the second assembly to receive containers having different sizes and/or configurations with the cartons stacked therein from the case infeed, wherein the second assembly is adjustable to support the different sizes and/or configurations of the cartons received as needed to contain and maintain the cartons in a stacked configuration as the containers are removed from the cartons and as the cartons are moved along the magazine conveyor toward a discharge thereof; and
   a stack pusher assembly downstream from the second assembly for engaging and supporting the cartons in their stacked configuration as the cartons are moved along the magazine conveyor toward the discharge of the magazine conveyor for feeding the cartons to a magazine for the packaging machine.

2. The system of claim 1, the second assembly further comprising a series of containment rods that are extensible into the containers between the cartons and at least one side wall of the containers to facilitate removal of the cartons from the containers.

3. The system of claim 1, wherein the first assembly or the magazine conveyor can be automatically adjusted such that a position of the inverted containers being placed on the magazine conveyor by the first assembly substantially matches a position of the magazine conveyor.

4. The system of claim 3, wherein the first assembly further comprises an inverter head having top and bottom case support guides, and which is mounted on a carriage that is movable along an orbital path over an access area as the containers are moved to their inverted position.

5. The system of claim 4, wherein the access area enables access to a portion of the packaging machine by an operator without interfering with movement of the containers along their orbital path from the case infeed to the magazine conveyor.

6. The system of claim 3, wherein the first assembly comprises a rotatable inverting head having adjustable side rails and top and bottom case support guides defining a receiving area for receiving and supporting containers of varying sizes with the cartons stacked therein, as the containers are reoriented and deposited onto the magazine conveyor for removal of the container.

7. The system of claim 1 and wherein the second assembly further comprises a lifting mechanism for removing the containers from about the cartons, with the cartons maintained in their stacked configuration.

8. The system of claim 1, wherein the second assembly further comprises a series of containment rods movable into engagement with the containers to facilitate removal of the containers from the cartons, and grippers adapted to move into an engaging position for engaging the cartons.

9. The system of claim 1 and wherein the stack pusher assembly includes at least one stack pusher carried by a drive system, the drive system engageable with a conveying mechanism for the magazine conveyor so as to move the at least one stack pusher therewith during feeding of a carton stack, and being selectively disengageable from the conveying mechanism of the magazine conveyor so as to be operable independently of the conveying mechanism of the magazine conveyor for repositioning of the at least one stack pusher with respect to a new stack of cartons loaded on the magazine conveyor.

10. The system of claim 9, wherein the at least one stack pusher comprises a pair of extensible pusher rods positioned above the magazine conveyor and moveable along the magazine conveyor, each of the pusher rods connected to an actuator for controlling retraction and extension of the pusher rods between a retracted, non-engaging position and an extended, engaging position for contacting and supporting the stacks of cartons as the stacks of cartons are moved along the magazine conveyor toward the discharge point.

11. A method of removing cartons from a case for feeding to a product packaging machine, comprising:
moving the case with a stack of cartons therein along a path of travel having an upstream direction and a downstream direction;
moving the case with the cartons stacked therein into a first assembly for inverting the case, and transporting the case from a first position on a case infeed conveyor to an inverted position on a magazine conveyor downstream of the case infeed conveyor;
transferring the case with the stack of cartons therein to a second assembly that is downstream of the first assembly and comprises containment mechanisms and is movable along the magazine conveyor;
moving the containment mechanisms of the second assembly into positions adjacent foremost and rearmost cartons of the stack of cartons received by the second assembly;
moving the second assembly along the magazine conveyor while holding the cartons in a stacked configuration with the second assembly and removing the case from the stack of cartons while the cartons are held by the second assembly;
engaging the stack of cartons with a stack pusher assembly after being held by the second assembly; and
continuing movement of the stack of cartons, while engaged with the stacker pusher assembly, along their path of travel along the magazine conveyor toward a discharge point as the case is moved away from the stacked cartons.

12. The method of claim 11, wherein transferring the case with the stack of cartons thereon to the second assembly comprises receiving the case on a carriage, engaging the stack of cartons, and wherein moving the containment mechanisms comprises moving a series of containment rods, adjacent upstream and downstream sides of the case and the foremost and rearmost cartons of the stack of cartons.

13. The method of claim 11, further comprising moving an additional stack of cartons toward a prior stack of cartons being urged toward the discharge point by the at least one stack pusher, as the additional stack of cartons approaches the prior stack of cartons, retracting the at least one stack pusher out of engagement therewith and moving the at least one stack pusher to a position behind the additional stack of cartons, urging the additional stack of cartons against the prior stack of cartons, and moving the combined stack of cartons forwardly with the at least one stack pusher.

14. The method of claim 11, the moving the case with the cartons stacked therein into the first assembly further comprising engaging at least lower and side edge portions of the case with case support guides.

15. The method of claim 14 and wherein moving the case to the inverted position comprises transporting the case along an orbital path upwardly and over an operator access area as the case is inverted, and placing the case on the magazine conveyor in its inverted position.

16. A carton decasing system for removing stacked series of cartons from cases for feeding to a product packaging machine, comprising:
a case infeed conveyor along which the cases are fed;
a carriage mounted on a rail assembly and adapted to receive the cases from the case infeed conveyor and transport the cases along a radially extending orbital path defined by the rail assembly and extending over an access area that provides an operator access to the packaging machine;
an apparatus movable along a magazine conveyor from a first position wherein the cases are received from the carriage, to a second position wherein the cases are removed from the cartons stacked therein;
wherein the apparatus is adjustable to support different sizes and/or configurations of the cartons received as needed to contain and/or maintain the cartons in a stacked configuration as the cases are removed from the cartons and as the cartons are moved along the magazine conveyor toward a discharge thereof; and
a stack pusher assembly located downstream from the apparatus along the magazine conveyor, the stack pusher assembly adapted to receive the cartons from the apparatus after removal of the cases therefrom and support and urge the cartons toward the discharge of the magazine conveyor for feeding the cartons into the packaging machine.

17. The carton decasing system of claim 16, wherein the carriage comprises an adjustable frame for receiving cases of varying sizes and inverts the cases as it transports the cases along its orbital path.

18. The carton decasing system of claim 16, further comprising a drive system controlling the movement of the carriage along its orbital path.

19. The carton decasing system of claim 18, wherein the drive system comprises a drive motor, and at least one belt, chain, cable, or combination thereof, extending along the rail assembly and on which the carriage is mounted and carried for moving the carriage along its orbital path.

20. The carton decasing system of claim 18, wherein the rail assembly comprises a series of rails supporting the carriage and an orbital frame supporting the rails and extending over the access area so as to define the access area and the orbital path of the carriage.

21. The carton decasing system of claim 16, wherein the rail assembly extends between a downstream end of the case infeed conveyor and an upstream end of the magazine conveyor.

22. The carton decasing system of claim 21, wherein the rail assembly has a first end adjacent the case infeed conveyor and a second end adjacent the apparatus.

23. The carton decasing system of claim 22, wherein the second end of the rail assembly is positioned downstream of the first end of the rail assembly.

24. The carton decasing system of claim 23, wherein the carriage is mounted for reversible movement along the rail assembly between the first end and the second end of the rail assembly.

25. A carton decasing system for removing cartons from cases to facilitate feeding of the cartons into a packaging machine, comprising:
  a case infeed along which the cases, with the cartons stacked therein, are fed;
  a carriage adapted to receive the cases from the case infeed and movable along a rail assembly so as to transport the cases to a conveyor, the rail assembly defining a radially extending orbital path that extends over an access area that provides an operator access to the packaging machine, the carriage transports the cases, with the cartons stacked therein, from a first position on the case infeed to an inverted position on the conveyor;
  an apparatus movable along the conveyor from a first position wherein the cases are received from the carriage, to a second position wherein the cases are removed from the cartons stacked therein, the apparatus being adjustable to support different sizes and/or configurations of the cartons received to contain and/or maintain the cartons in a stacked configuration as the cases are removed therefrom and as the cartons are moved along the conveyor toward a discharge; and
  a stack pusher assembly located downstream from the apparatus along the conveyor, the stack pusher assembly adapted to receive the cartons from the assembly after removal of the cases therefrom and support and urge the cartons toward a discharge of the conveyor such that the cartons are positioned to be fed into the packaging machine.

26. The carton decasing system of claim 25, wherein the rail assembly extends between a downstream end of the case infeed and an upstream end of the conveyor.

27. The carton decasing system of claim 26, wherein the rail assembly has a first end adjacent the case infeed and a second end adjacent the apparatus.

28. The carton decasing system of claim 27, wherein the second end of the rail assembly is positioned downstream of the first end of the rail assembly.

29. The carton decasing system of claim 28, wherein the carriage is mounted for reversible movement along the rail assembly between the first end and the second end of the rail assembly.

* * * * *